(12) United States Patent
Bassett

(10) Patent No.: US 9,291,150 B2
(45) Date of Patent: Mar. 22, 2016

(54) SYSTEMS AND METHODS TO GENERATE ELECTRICITY USING A FLOW OF AIR

(76) Inventor: Clifford Bassett, Tipton, IN (US)

( * ) Notice: Subject to any disclaimer, the term of this patent is extended or adjusted under 35 U.S.C. 154(b) by 1016 days.

(21) Appl. No.: 13/500,266

(22) PCT Filed: Nov. 5, 2010

(86) PCT No.: PCT/US2010/055613
§ 371 (c)(1),
(2), (4) Date: Apr. 4, 2012

(87) PCT Pub. No.: WO2011/057067
PCT Pub. Date: May 12, 2011

(65) Prior Publication Data
US 2012/0187698 A1      Jul. 26, 2012

Related U.S. Application Data

(60) Provisional application No. 61/258,576, filed on Nov. 5, 2009.

(51) Int. Cl.
*F03D 3/04* (2006.01)
*F03D 3/06* (2006.01)
*F03D 3/00* (2006.01)

(52) U.S. Cl.
CPC ............. *F03D 3/005* (2013.01); *F03D 3/0418* (2013.01); *F03D 3/061* (2013.01); *F03D 3/065* (2013.01);
(Continued)

(58) Field of Classification Search
CPC ....... F03D 3/04; F03D 3/0409; F03D 3/0418; F03D 3/005; F03D 3/061; F03D 3/062; F03D 3/064; F03D 3/065
See application file for complete search history.

(56) References Cited

U.S. PATENT DOCUMENTS 3,883,750 A    5/1975  Uzzell
4,017,205 A *  4/1977  Bolie .................. 415/208.2
(Continued)

FOREIGN PATENT DOCUMENTS

| EP | 1961956 A1 * | 8/2008 | ............ F03D 1/04 |
| FR | 2811720 A1 * | 1/2002 | ............ F03D 3/02 |
| GB | 192405 A *   | 8/1923 | |

OTHER PUBLICATIONS

International Searching Authority, International Search Report, dated Jan. 25, 2011.
(Continued)

*Primary Examiner* — Ninh H Nguyen
*Assistant Examiner* — Christopher R Legendre
(74) *Attorney, Agent, or Firm* — Brannon Sowers & Cracraft PC; C. John Brannon

(57) ABSTRACT

A system to generate electricity using a flow of air of the present disclosure, the system comprises a turbine assembly comprising a cylindrical blade drum comprising a plurality of vertical blades, a cone positioned at least substantially within the cylindrical blade drum, the cone defining an upper cone aperture and a lower cone aperture having a larger diameter than the upper cone aperture, and a fan blade positioned at or below the lower cone aperture, the fan capable of rotation to force air in an upward vertical direction, an exterior housing assembly surrounding the turbine assembly, and a vertical shaft having a first end and a second end, the first end positioned at or near the turbine assembly and the second end positioned within an alternator/generator in an interior portion of a building, wherein rotation of the cylindrical blade drum causes the alternator/generator to generate electricity.

17 Claims, 20 Drawing Sheets

(52) U.S. Cl.
CPC ....... *F05B 2240/12* (2013.01); *F05B 2240/131* (2013.01); *F05B 2240/133* (2013.01); *F05B 2240/911* (2013.01); *F05B 2240/9111* (2013.01); *Y02B 10/30* (2013.01); *Y02E 10/728* (2013.01); *Y02E 10/74* (2013.01)

(56) References Cited

U.S. PATENT DOCUMENTS

| | | | |
|---|---|---|---|
| 4,508,973 A | 4/1985 | Payne | |
| 5,463,257 A * | 10/1995 | Yea | 290/55 |
| 6,638,005 B2 * | 10/2003 | Holter et al. | 415/4.2 |
| 6,740,989 B2 | 5/2004 | Rowe | |
| 6,984,899 B1 * | 1/2006 | Rice | 290/44 |
| 7,400,057 B2 * | 7/2008 | Sureshan | 290/55 |
| 8,556,571 B2 | 10/2013 | Cassidy | |
| 2004/0100103 A1 | 5/2004 | Becherucci | |
| 2009/0280008 A1 | 11/2009 | Brock | |
| 2012/0187698 A1 * | 7/2012 | Bassett | 290/55 |
| 2014/0105738 A1 * | 4/2014 | Bassett | 415/202 |
| 2014/0105743 A1 * | 4/2014 | Bassett | 416/126 |
| 2014/0133965 A1 * | 5/2014 | Ginsburg | 415/122.1 |

OTHER PUBLICATIONS

International Searching Authority (ISA), Written Opinion of ISA, dated Jan. 25, 2011.

* cited by examiner

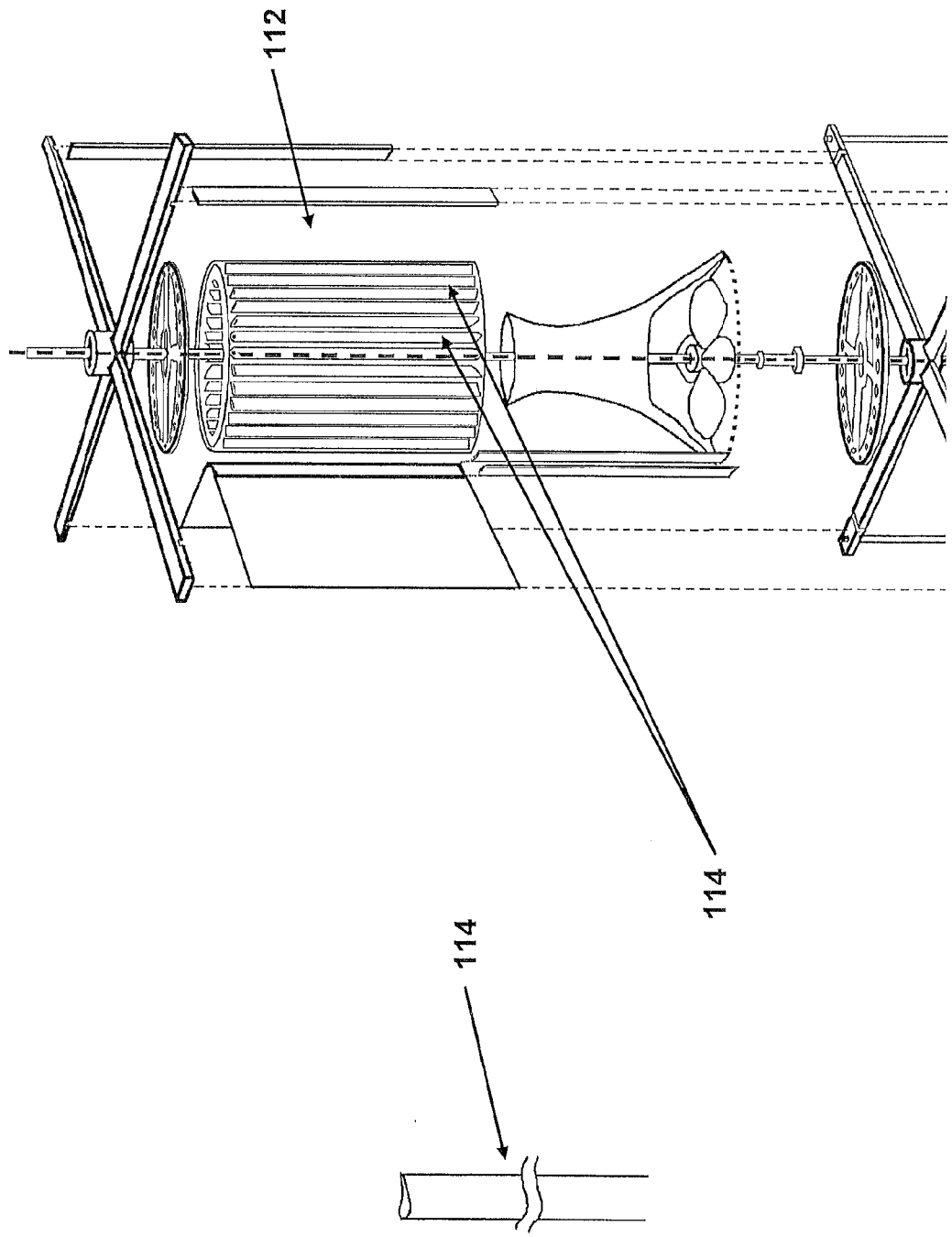

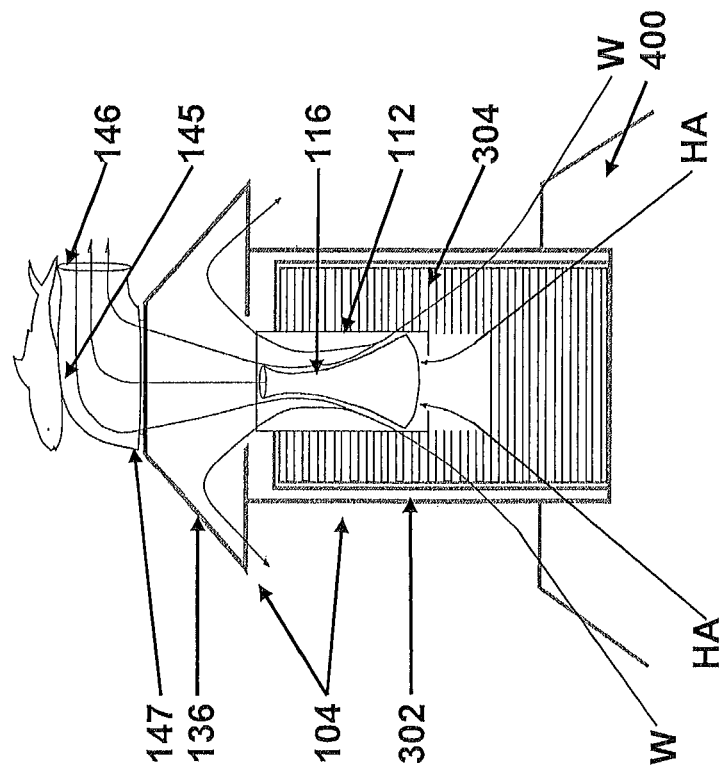
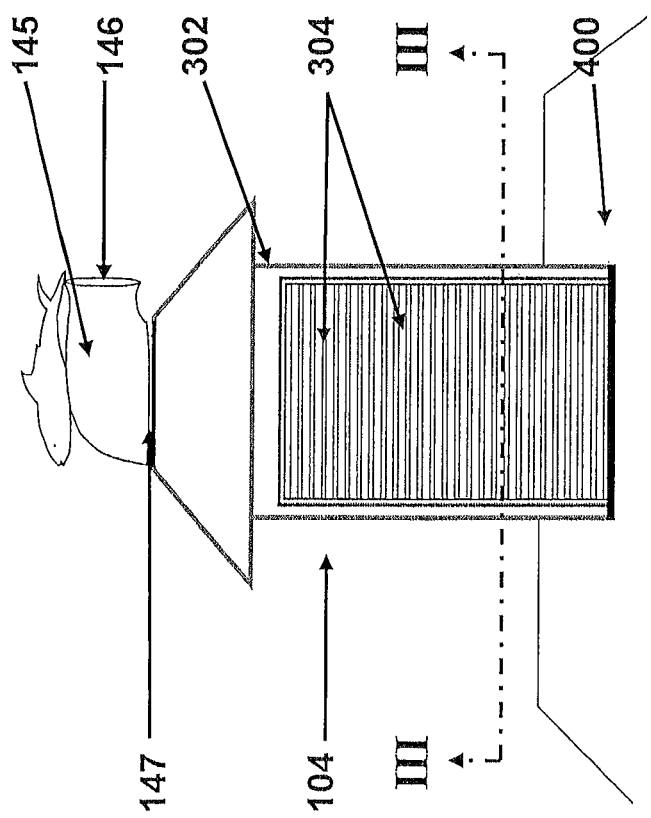
FIG. 4D
FIG. 4C

SYSTEMS AND METHODS TO GENERATE ELECTRICITY USING A FLOW OF AIR

RELATED APPLICATIONS

The present application is related to, claims the priority benefit of, and is a 35 U.S.C. §371 national stage entry of, International Patent Application Serial No. PCT/US2010/055613, filed Nov. 5, 2010, which is related to, and claims the priority benefit of, U.S. Provisional Patent Application Ser. No. 61/258,576, filed Nov. 5, 2009. The contents of each of these applications are hereby incorporated by reference in their entirety into this disclosure.

BACKGROUND

The generation of electricity using wind involves the use of windmills, typically very sizable windmills having diameters of tens, if not hundreds of feet. Such windmills are not only extremely heavy, but are generally spaced apart from one another by a large distance in a field so that each windmill does not negatively interact with one another (by way of disrupted wind/air flow) during rotation.

The overall size of such windmills is required, as such a standard windmill configuration must be large in order to generate enough electricity. As such, wind-generated electricity requires large equipment, sometimes hundreds of feet tall and wide and several acres of space in order to be effective.

Accordingly, it would be desirable to have an effective and much more compact electricity generation system using wind and air, including such systems that blend into an overall building structure or landscape. Additionally, current propeller configured windmills must be mounted on a pole or tower and are therefore restricted to narrowly defined geographic locations and applications.

BRIEF SUMMARY

In at least one exemplary embodiment of a system to generate electricity using a flow of air of the present disclosure, the system comprises a turbine assembly, comprising a cylindrical blade drum comprising a plurality of vertical blades, a cone positioned at least substantially within the cylindrical blade drum, the cone defining an upper cone aperture and a lower cone aperture having a larger diameter than the upper cone aperture, and a fan blade positioned at or below the lower cone aperture, the fan capable of rotation to force air in an upward vertical direction, an exterior housing assembly surrounding the turbine assembly, and a vertical shaft having a first end and a second end, the first end positioned at or near the turbine assembly and the second end positioned within an alternator/generator, wherein rotation of the cylindrical blade drum causes the alternator/generator to operate to generate electricity. In another embodiment, the fan is capable of forcing the air upward through the lower cone aperture and the upper cone aperture. In an additional embodiment, and when the turbine assembly is coupled to a building structure, the fan is capable of rotation due to relatively hot air escaping through an aperture defined in the building structure and into the turbine assembly.

In at least one exemplary embodiment of a system to generate electricity using a flow of air of the present disclosure, the system further comprises a top hub assembly and a bottom hub assembly, said assemblies capable of assembling the cylindrical blade drum, the cone, and the fan blade. In an additional embodiment, the exterior housing assembly comprises a top cross-member, a bottom cross-member, a plurality of wind funnels, each wind funnel having a funnel side wall defining a vertical slit therein, each wind funnel positioned external to the turbine assembly whereby an apex of each fixed side wall faces the turbine assembly, and a plurality of vertical supports external to the plurality of wind funnels, the plurality of vertical supports coupled to the top cross-member and the bottom-cross member. In yet an additional embodiment, each funnel side wall has a configuration selected from the group consisting of a flat configuration, a convex configuration, and a hyperbolic configuration.

In at least one exemplary embodiment of a system to generate electricity using a flow of air of the present disclosure, the system further comprises an integrated scoop assembly configured to position the exterior housing assembly upon a roof of a building structure. In another embodiment, the integrated scoop assembly comprises lower walls configured to correspond to the roof to which the system is coupled thereto. In yet another embodiment, the integrated scoop assembly comprises an upper wall configured to correspond to the bottom cross-member.

In at least one exemplary embodiment of a system to generate electricity using a flow of air of the present disclosure, the turbine assembly further comprises a wind break drum substantially surrounding the cylindrical blade drum. In an additional embodiment, the wind break drum defines a plurality of break apertures corresponding to the vertical slits of the plurality of wind funnels. In yet an additional embodiment, rotation of the wind break drum regulates wind flow available to the turbine assembly. In another embodiment, the each of the plurality of vertical blades comprises an airfoil configuration.

In at least one exemplary embodiment of a system to generate electricity using a flow of air of the present disclosure, the rotation of the cylindrical blade drum is due to air flow upon the plurality of vertical blades. In another embodiment, the air flow comes from air outside of a building structure to which the turbine assembly is coupled thereto. In yet another embodiment, the air flow comes from air within a building structure to which the turbine assembly is coupled thereto. In an additional embodiment, the air flow comes from air within an attic of the building structure. In yet an additional embodiment, rotation of the cylindrical blade drum increases in velocity when the air flow from the attic increases in temperature.

In at least one exemplary embodiment of a system to generate electricity using a flow of air of the present disclosure, the top hub assembly and the bottom hub assembly comprise earth magnets, the earth magnets permitting rotation of the cylindrical blade drum. In an additional embodiment, the top hub assembly and the bottom hub assembly comprise bushings and bearings, the bushings and bearings permitting rotation of the cylindrical blade drum. In yet an additional embodiment, the vertical slits of the plurality of wind funnels are configured to correspond to dimensions of the plurality of vertical blades.

In at least one exemplary embodiment of a system to generate electricity using a flow of air of the present disclosure, operation of the system generates a direct current. In another embodiment, the direct current is used by one or more direct current loads within a building structure to which the system is coupled thereto. In yet another embodiment, the building structure is further coupled to a utility service providing alternating current for use by one or more alternating current loads within the building structure. In an additional embodiment, the system further comprises a clutch operably coupled to the vertical shaft, the clutch operable to engage and regulate rotation of the vertical shaft.

In at least one exemplary embodiment of a system to generate electricity using a flow of air of the present disclosure, the exterior housing assembly further comprises a housing roof assembly. In an additional embodiment, the housing roof assembly comprises a lower pyramid defining a pyramid aperture therethrough, and an upper pyramid coupled to the lower pyramid by way of one or more pyramid legs. In yet an additional embodiment, air is capable of flowing through the cylindrical blade drum in an upward direction and out of the system through the lower pyramid. In another embodiment, the housing roof assembly comprises a wind vane defining a wind vane aperture therethrough, and a swivel mechanism coupled to the wind vane, the swivel mechanism capable of permitting a full 360° rotation of the wind vane. In yet another embodiment, air is capable of flowing through the cylindrical blade drum in an upward direction and out of the system through the wind vane aperture.

In at least one exemplary embodiment of a system to generate electricity using a flow of air of the present disclosure, the exterior housing assembly further comprises a plurality of housing walls defining apertures therethrough. In another embodiment, the system further comprises a securing assembly for securing portions of the system to a building structure, the securing assembly comprising a central platform sized and shaped to engage one or more components of the system and to fit upon a building structure, one or more threaded rods, each threaded rod having a first end and a second end, the first end of each threaded rod configured to engage the central platform, and one or more first foot plates sized and shaped to engage the second end of each threaded rod. In yet another embodiment, the exterior housing assembly comprises a bottom cross-member, and wherein when at least one of the one or more threaded rods is positioned through the central platform, the at least one of the one or more threaded rods is capable of engaging the bottom cross-member and at least one of the one or more first foot plates to secure the system to the building structure. In an additional embodiment, the securing assembly further comprises a ridge collar positioned between the central platform and the building structure, the ridge collar configured to engage a building structure apex and provide support for the central platform.

In at least one exemplary embodiment of a system to generate electricity using a flow of air of the present disclosure, the central platform further comprises a plurality of apertures defined therein, said apertures sized and shaped to receive one or more threaded rods. In another embodiment, the system further comprises one or more fixed reversed nuts coupled to the central platform at the one or more of the plurality of apertures, the one or more fixed reverse nuts configured to engage the one or more threaded rods. In yet another embodiment, each of the one or more threaded rods comprises an adjustable nut coupled thereto, each of the adjustable nuts capable of rotation about the one or more threaded rods to secure the one or more threaded rods about the central platform. In an additional embodiment, when the one or more first foot plates are positioned inside the building structure, the one or more threaded rods are capable of engaging the one or more first foot plates through one or more building structure apertures. In yet an additional embodiment, the securing assembly further comprises one or more second foot plates defining one or more foot plate apertures therethrough, the one or more second foot plates configured to engage the threaded rod. In another embodiment, when the one or more second foot plates are positioned outside the building structure, the one or more threaded rods are capable of engaging the one or more second foot plates to provide additional structural stability to the system when the system is coupled to the building structure.

In at least one exemplary embodiment of a system to generate electricity using a flow of air of the present disclosure, the one or more foot plates have one or more foot plate nuts coupled thereto, the one or more foot plate nuts configured to engage the one or more threaded rods to allow for adjustment and/or tightening of the one or more threaded rods about the one or more foot plate nuts. In another embodiment, the securing assembly further comprises one or more foot pivot assemblies, each of the one or more foot pivot assemblies comprising a pivotable foot, and a first foot wall and a second foot wall positioned on opposing sides of the pivotable foot, the first foot wall and the second foot wall pivotally engaging the pivotable foot. In yet another embodiment, the pivotable foot defines a foot aperture therethrough, the foot aperture configured to receive the threaded rod. In an additional embodiment, the system is capable of vertical alignment by way of adjusting the one or more threaded rods of the securing assembly using the one or more foot pivot assemblies.

In at least one exemplary embodiment of a system to generate electricity using a flow of air of the present disclosure, the turbine assembly is positioned external to a building structure, and wherein the alternator/generator is positioned in an interior portion of the building structure. In another embodiment, the turbine assembly is positioned external to the building structure, and wherein the alternator/generator is positioned within the central platform.

In at least one exemplary embodiment of a system to generate electricity using a flow of air of the present disclosure, the system comprises a turbine assembly comprising a cylindrical blade drum comprising a plurality of vertical blades, an exterior housing assembly surrounding the turbine assembly, and a vertical shaft having a first end and a second end, the first end positioned at or near the turbine assembly and the second end positioned within an alternator/generator, wherein rotation of the cylindrical blade drum causes the alternator/generator to operate to generate electricity. In an additional embodiment, the turbine assembly further comprises a cone positioned at least substantially within the cylindrical blade drum, the cone defining an upper cone aperture and a lower cone aperture having a larger diameter than the upper cone aperture, and a fan blade positioned at or below the lower cone aperture, the fan capable of rotation to force air in an upward vertical direction.

In at least one exemplary embodiment of a system to generate electricity using a flow of air of the present disclosure, the system comprises a turbine assembly, comprising a cylindrical blade drum comprising a plurality of vertical blades, a cone positioned at least substantially within the cylindrical blade drum, the cone defining an upper cone aperture and a lower cone aperture having a larger diameter than the upper cone aperture, a fan blade positioned at or below the lower cone aperture, the fan capable of rotation to force air in an upward vertical direction, and a wind break drum substantially surrounding the cylindrical blade drum, the wind break drum defining a plurality of break apertures, an exterior housing assembly surrounding the turbine assembly, comprising a top cross-member, a bottom cross-member, a plurality of wind funnels, each wind funnel having a funnel side wall defining a vertical slit therein, each wind funnel positioned external to the turbine assembly whereby an apex of each fixed side wall faces the turbine assembly, and a plurality of vertical supports external to the plurality of wind funnels, the plurality of vertical supports coupled to the top cross-member and the bottom-cross member, and a vertical shaft having a first end and a second end, the first end positioned at or near the turbine assembly and the second end positioned within an alternator/generator, wherein rotation of the cylindrical blade drum causes the alternator/generator to operate to generate electricity.

In at least one exemplary embodiment of a turbine assembly for use with a system to generate electricity using a flow of air of the present disclosure, the turbine assembly comprises a cylindrical blade drum comprising a plurality of vertical blades, a cone positioned at least substantially within the cylindrical blade drum, the cone defining an upper cone aperture and a lower cone aperture having a larger diameter than the upper cone aperture, and a fan blade positioned at or below the lower cone aperture, the fan capable of rotation to force air in an upward vertical direction, wherein when the turbine assembly is coupled to a building structure, the fan is capable of rotation due to relatively hot air escaping through an aperture defined in the building structure and into the turbine assembly. In an additional embodiment, the turbine assembly further comprises a wind break drum substantially surrounding the cylindrical blade drum. In yet an additional embodiment, the wind break drum defines a plurality of break apertures corresponding to the vertical slits of the plurality of wind funnels. In another embodiment, rotation of the wind break drum regulates wind flow available to the turbine assembly.

In at least one exemplary embodiment of a turbine assembly for use with a system to generate electricity using a flow of air of the present disclosure, the turbine assembly is configured to fit within an exterior housing assembly comprising a top cross-member, a bottom cross-member, a plurality of wind funnels, each wind funnel having a side wall defining a vertical slit therein, each wind funnel positioned external to the turbine assembly whereby an apex of each funnel side wall faces the turbine assembly, and a plurality of vertical supports external to the plurality of wind funnels, the plurality of vertical supports coupled to the top cross-member and the bottom-cross member. In another embodiment, each funnel side wall has a configuration selected from the group consisting of a flat configuration, a convex configuration, and a hyperbolic configuration.

In at least one exemplary embodiment of a method of generating electricity using a flow of air of the present disclosure, the method comprises the step of operating an exemplary system of the present disclosure to generate electricity. In another embodiment, the step of operating the system comprises rotation of the cylindrical blade drum due to air flow upon the plurality of vertical blades, whereby rotation of the cylindrical blade drum causes the vertical shaft to rotate to cause the alternator/generator to generate electricity.

BRIEF DESCRIPTION OF THE DRAWINGS

FIG. 1B shows a drawing of one example of an exemplary configuration of an embodiment of a vertical blade according to the present disclosure;

FIG. 1C shows a drawing of an exemplary configuration of an embodiment of a vertical blade as part of a cylindrical blade drum according to the present disclosure;

FIG. 4C shows a side view of at least a portion of an exemplary embodiment of an exterior housing assembly and wind vane venting assembly coupled to the pyramid assembly according to the present disclosure;

FIG. 4D shows a side view shows of at least a portion of an exemplary embodiment of a central cone assembly and a pyramid assembly coupled to a wind vane venting assembly according to the present disclosure;

DETAILED DESCRIPTION

Figure 1A:
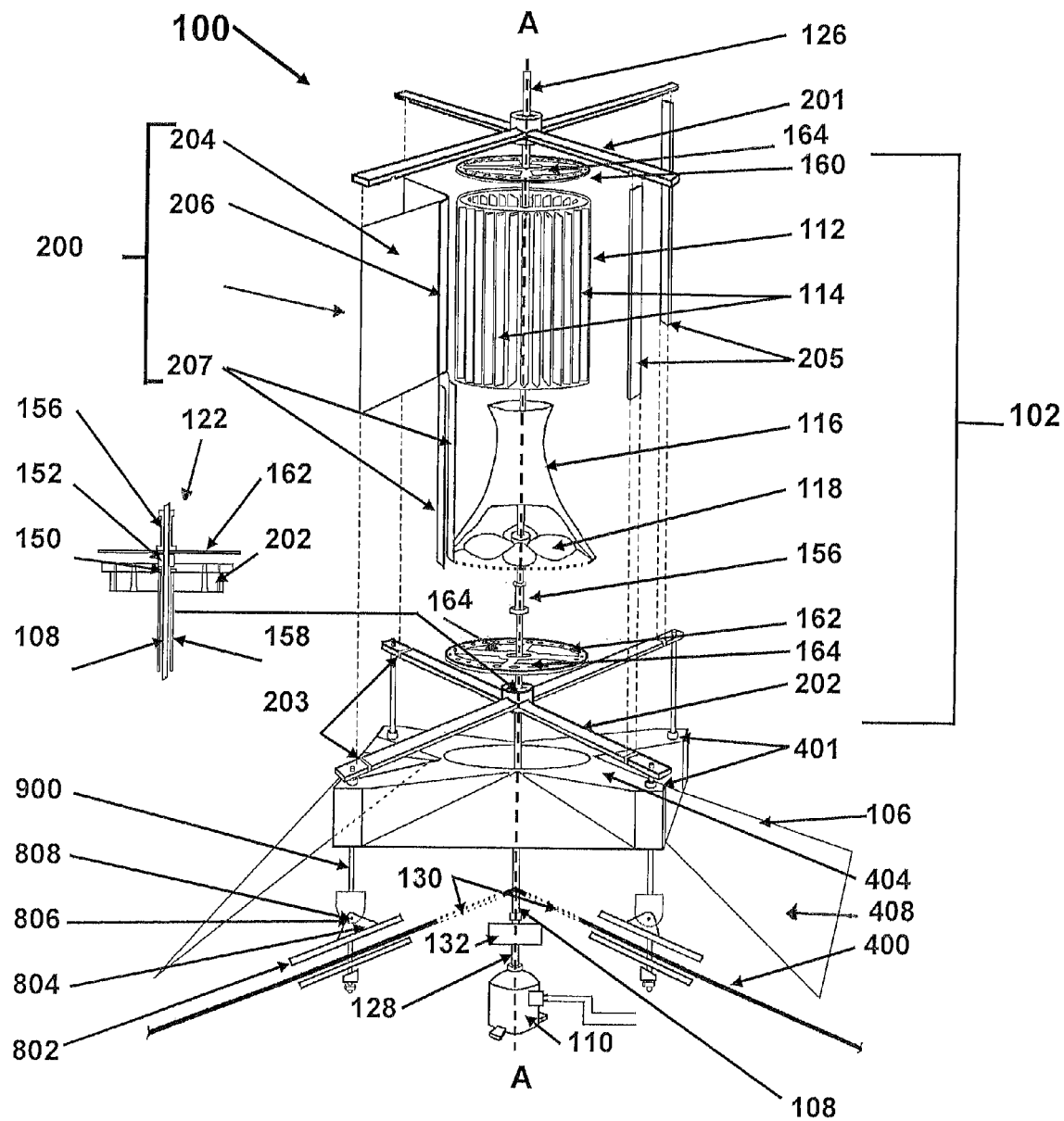
FIG. 1A shows a partial exploded view of various components of an embodiment of an exemplary system to generate electricity using a flow of air according to the present disclosure.

The present application discloses various systems for generating electricity using a flow of air and methods for using and constructing the same. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2A:
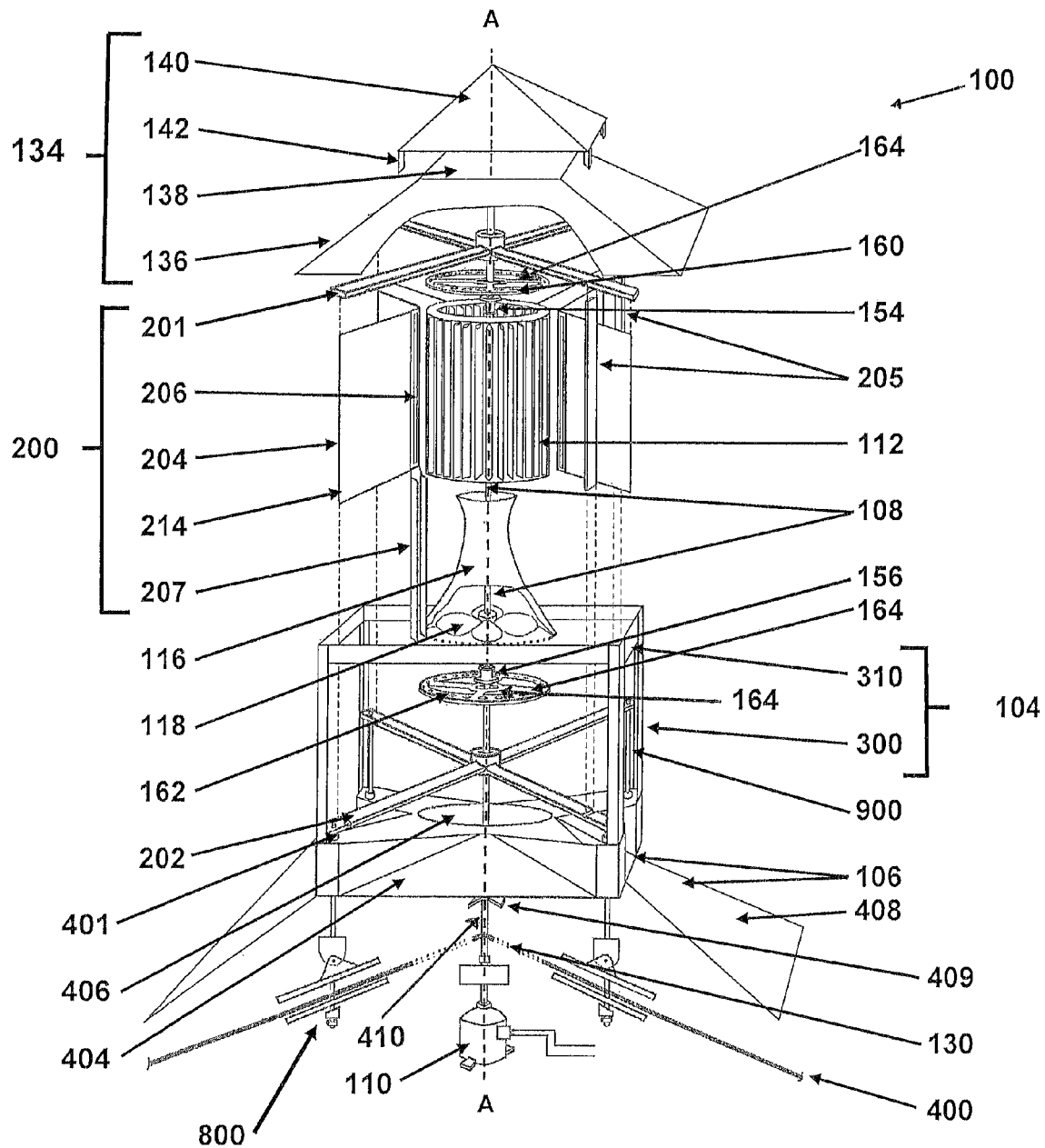
FIG. 2A shows a partial exploded view of various components of an embodiment of another exemplary system to generate electricity using a flow of air according to the present disclosure.

FIG. 1A shows an exploded view of various components of an exemplary system to generate electricity using a flow of air according to the present disclosure. As shown in FIG. 1A, system 100 comprises a turbine assembly 102, with various components of at least one embodiment of a system 100 shown therein. FIG. 2A shows an exemplary embodiment of a system 100 of the present disclosure, comprising an exterior housing assembly 104, an integrated scoop assembly 106, a vertical shaft 108, and an alternator/generator 110, as descried in further detailed herein.

As shown in FIG. 1A, an exemplary turbine assembly 102 of system 100 comprises a cylindrical blade drum 112 comprising a plurality of vertical blades 114, wherein each vertical blade 114 is positioned at or near the external circumference of the cylindrical blade drum 112. Cylindrical blade drum 112, when in operation, would rotate about its vertical axis A-A shown in FIG. 1A. In at least one embodiment of a cylindrical blade drum 112 of the present disclosure, vertical blades 114 are equally spaced and aligned around the circumference of cylindrical blade drum 112. Vertical blades 114 facilitate rotation of cylindrical blade drum 112 due to air flow from any direction.

In at least one embodiment of system 100, each vertical blade 114 is designed with an aerodynamic configuration for performance and responsiveness to the broadest range of wind (air flow) conditions using effective airfoil design and the angle of each vertical blade 114. Each vertical blade 114, as shown in FIGS. 1B and 1C, responds to the movement of air across its surface similar to the wings of an airplane, which themselves achieve lift by creating negative air pressure on the upper side of the airfoil. Similarly, the airfoil design of a turbine assembly 102 of the present disclosure moves in the direction of negative air pressure as air moves across the surface of the airfoil (namely the plurality of vertical blades 114), whereby vertical blades 114 are pushed by the wind to assist with rotation of cylindrical blade drum 112. FIGS. 1B and 1C show drawings of an exemplary configuration of a vertical blade 114 external to and as part of a cylindrical blade drum 112, respectively, whereby the airfoil design/configuration of such an exemplary vertical blade 114 is readily apparent.

Figure 4B:
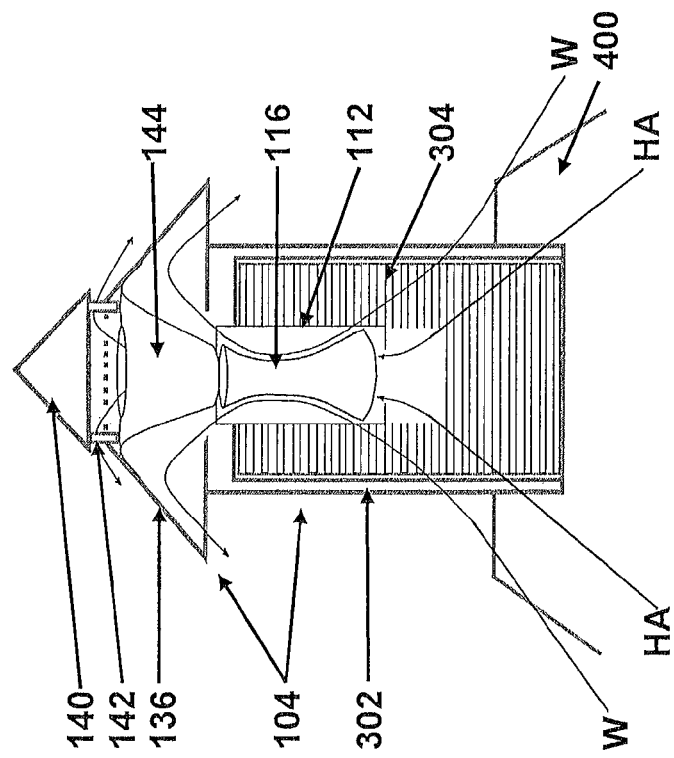
FIG. 4B shows a side view of at least a portion of an exemplary embodiment of a central cone assembly and a top pyramid cone assembly according to the present disclosure.

An exemplary turbine assembly 102 of the present disclosure, and as shown in FIGS. 1A and 2A, further comprises a truncated cone 116 positioned within cylindrical blade drum 112, with cone 116 having a larger diameter at the bottom than at the top (e.g. a relatively small aperture at the top of the cone and a relatively large aperture at the bottom of the cone). In at least one exemplary embodiment of the present disclosure, cone 116 has hyperbolic concave sides to expedite air flow through the interior of cone 116. In addition, an exemplary turbine assembly 102 comprises a fan blade 118 positioned within cone 116, whereby rotation of fan blade 118 is capable of using forced air from an attic (for example) in an upward vertical direction through the inside of cone 116. Cone 116, in at least one embodiment, operates in at least three different ways, namely to (i) deflect wind passing through vertical blades 114 up and out of cylindrical blade drum 112 on the outside of cone 116 as shown in FIG. 4B, (ii) act as a barrier to hot air rising from an attic or other upper portion of a building where relatively hot air accumulates, segregating air from the outside to reduce the likelihood of energy loss of system 100 through turbulence or back pressure, and (iii) direct the hot air exiting fan blade 118 from the attic up and out of the top of cone 116 through the center of cone 116.

Fan blade 118, in at least one embodiment, is a conventional wide prop fan blade aligned on vertical shaft 108 that may operate in at least two ways. First, fan blade 118 may operate passively due to rising hot attic exhaust air, whereby such hot air causes fan blade 118 to rotate, whereby rotation of fan blade 118 expedites the flow of hot attic exhaust air through the center of cylindrical blade drum 112 to supply additional power to the rotation of the cylindrical blade drum 112 to generate electricity as described in further detail herein. Second, fan blade 118 may operate due to the flow of air external to system 100 (outside air) through system 100, whereby such air causes fan blade 118 to rotate to further increase the relative rotation of cylindrical blade drum 112. Such operation of fan blade 118 to allow for the exit of hot air from a home attic, for example, operates as a ventilation system or hot air exhaust system. As discussed in further detail herein, on days with little or no outside wind to facilitate rotation of cylindrical blade drum 112, additional power coming from a heated attic and hot attic air may be available to rotate cylindrical blade drum 112. In at least one additional embodiment, fan blade 118 may be powered by an external power source (not shown), whereby operation of such a power source may actively cause fan blade 118 to rotate to assist the rotation of cylindrical blade drum 112 as referenced herein.

Turbine assembly 102, in at least one embodiment, may be held together using a top hub assembly 120 and a bottom hub assembly 122 as shown in FIGS. 1A, 1D, 1E, and 2A. In at least one embodiment of system 100, cylindrical blade drum 112 revolves around a central axis (shown as A-A in FIG. 1A) with top hub assembly 120 and bottom hub assembly 122 functioning similar to spokes on a wheel, namely to permit cylindrical blade drum 112 to rotate about, attach to, an in at least one embodiment, substantially to completely steady turbine assembly 102 on vertical axis A-A.

In at least one embodiment of a system to generate electricity using a flow of air of the present disclosure, such a system 100 comprise an exterior housing assembly 104 positioned around turbine assembly 102 as shown in FIG. 2A. In an exemplary embodiment, an exterior housing assembly 104, as shown in FIG. 2A, comprises a top cross-member 201, a bottom cross-member 202 and a plurality of wind funnels 204, with each funnel 204 having a funnel side wall 210 defining a vertical slit 206 therein. Funnel side walls 210, in various embodiments, may comprise straight or flat sides, hyperbolic sides, or convex sides. As shown in FIGS. 2D and 2E, wind funnels 204 may further comprise funnel top walls 211 coupled to the funnel side walls 210.

Figure 3:
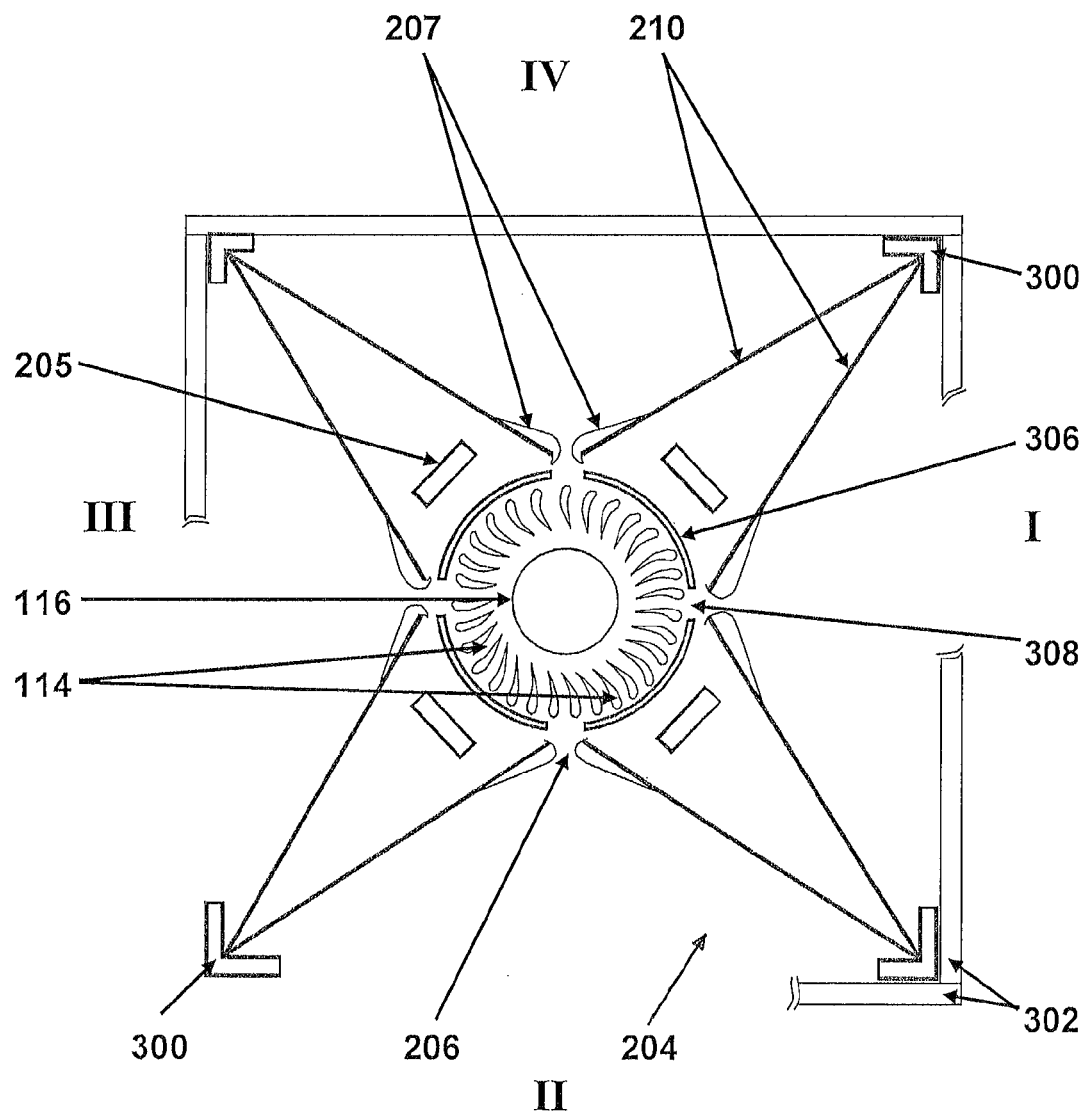
FIG. 3 shows a cross-sectional view of at least a portion of an embodiment of a system to generate electricity using a flow of air as it relates to an embodiment of an exterior housing assembly according to the present disclosure.

Wind funnels 204, in at least one embodiment, are attached to vertical tie bars 205 which may be sandwiched between and mount to top cross-member 201 and bottom cross member 202. In an exemplary embodiment comprising four wind funnels 204, each of the four wind funnels 204 surround cylindrical blade drum 112, whereby each of the four wind funnels 204 occupies 90 degrees of a 360 degree perimeter. Each 90 degree quadrant would comprise one wind funnel assembly 200, which may include the various components as shown in FIG. 2A, that would focus the wind to the vertical blades 114 of cylindrical blade drum 112. For example, and as shown in FIG. 3, quadrant I would occupy 0 degrees to 90 degrees, quadrant II would occupy approximately 91 degrees to 180 degrees, quadrant III would occupy approximately 181 degrees to 270 degrees, and quadrant IV would occupy approximately 271 degrees to 360 degrees.

In at least one embodiment, the four wind funnel assemblies 200 are fixed in position, and the combined effect of the configuration is to capture the wind from 360 degrees. Each vertical slit 206 in each wind funnel 204, in at least one embodiment, holds a nozzle 207, such as a venturi nozzle, which accelerates the air passing through the vertical slit 206/venturi nozzle 207 directed toward the cylindrical blade drum 112. In an exemplary embodiment comprising a venturi nozzle 207, it is the combination of the wind funnel 204, the vertical slit 206 and the vertical venturi nozzle 207 assembly that focuses and accelerates the wind toward one vertical blade 114 at a time as it passes through the cylindrical blade drum assembly 112.

Figure 2B:
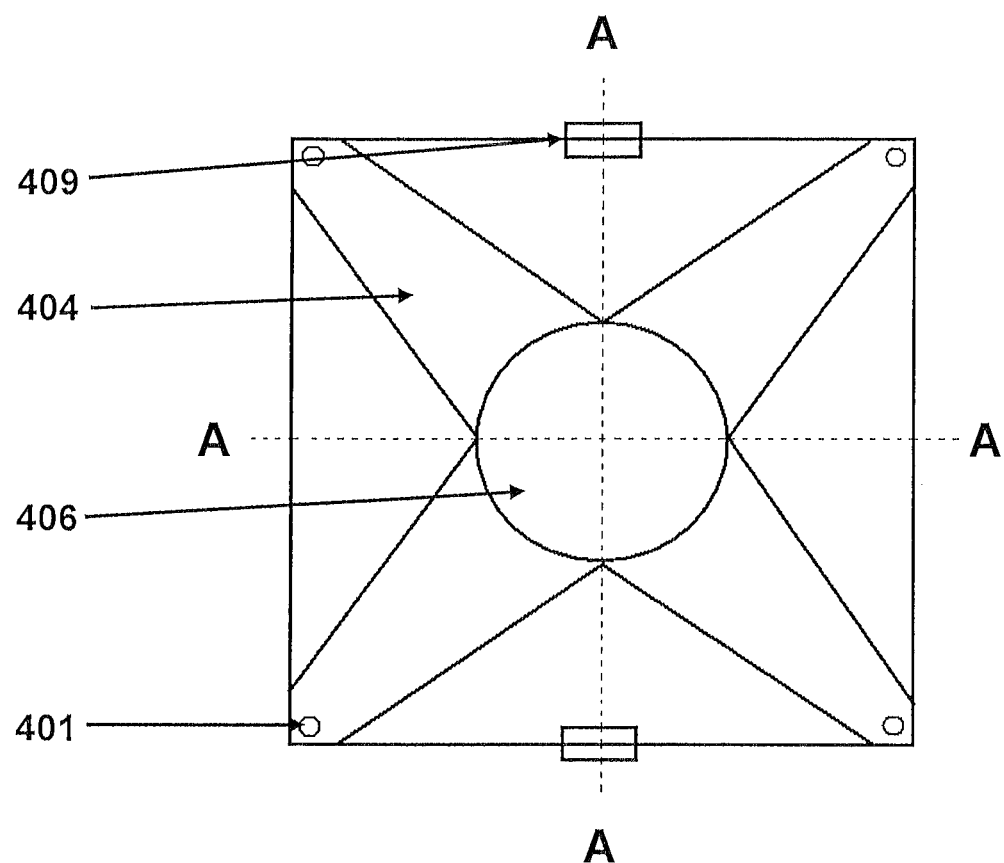
FIG. 2B shows a top-down view of at least a portion of various components of an embodiment of the central platform assembly according to the present disclosure.
Figure 2C:
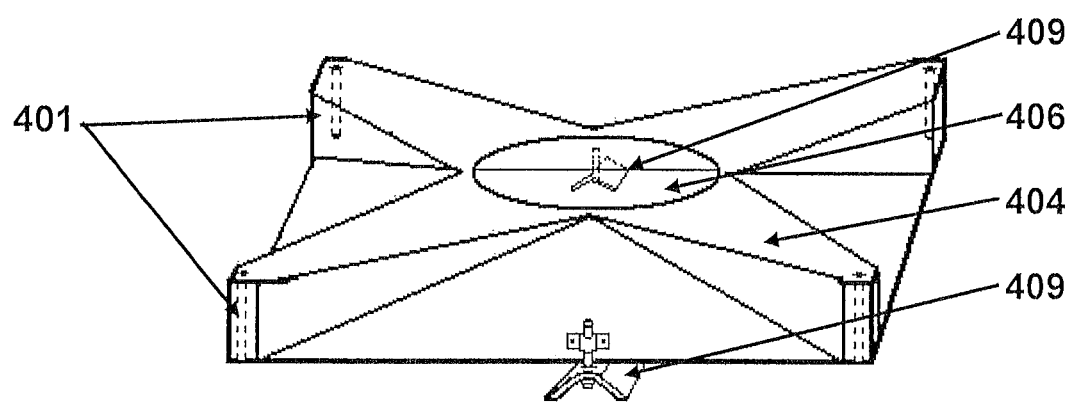
FIG. 2C shows a front view of at least a portion of various components of an embodiment of the central platform assembly according to the present disclosure.
Figure 2D:
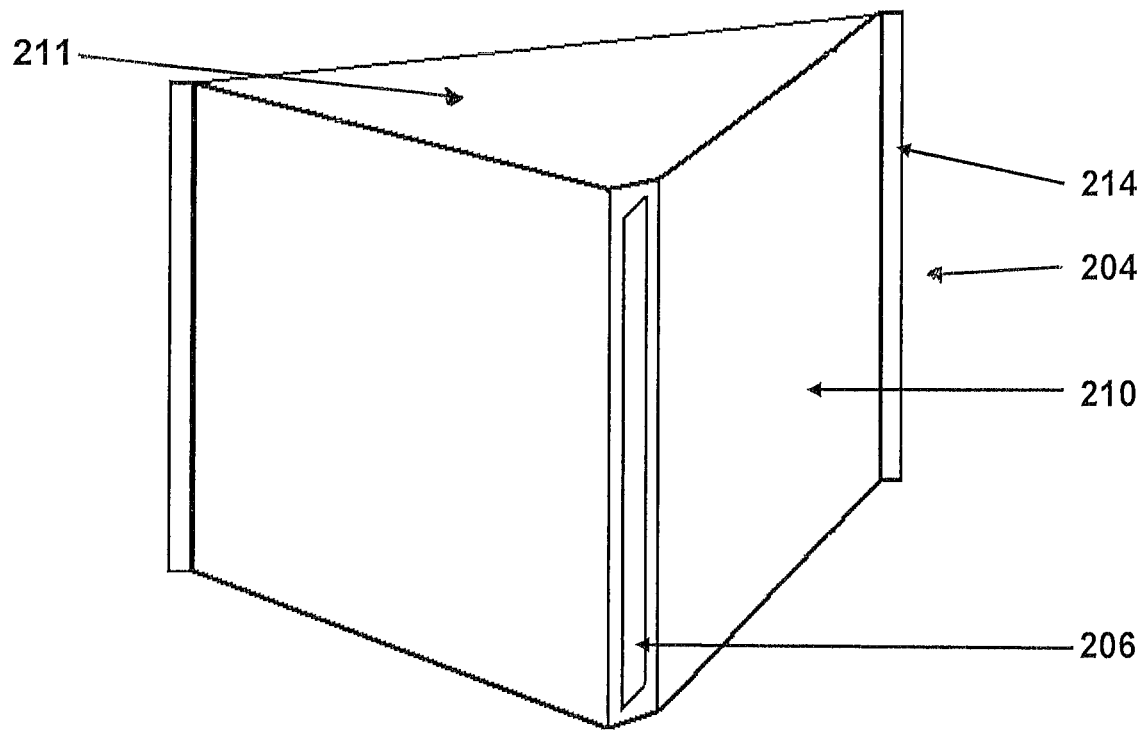
FIG. 2D shows a front view of at least a portion of an embodiment of a wind funnel with vertical slit and flanges according to the present disclosure.
Figure 2E:
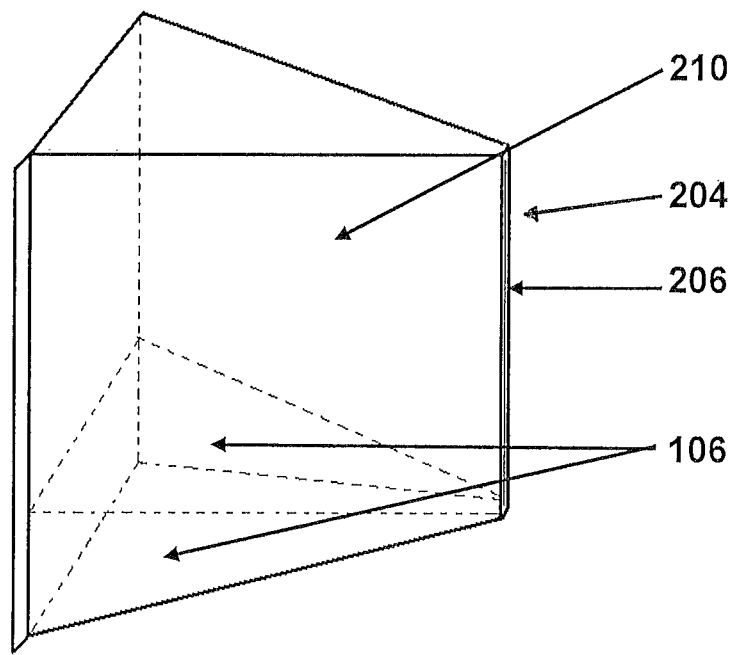
FIG. 2E shows a side view of at least a portion of an embodiment of a wind funnel assembly according to the present disclosure.

In one exemplary embodiment, and as shown in the top-down and front views of a portion of the housing and support system as shown in FIGS. 2B and 2C, the central platform base 404 may comprise a generally solid rigid base in conjunction with top cross-member 200, bottom cross-member 202, and a plurality of vertical tie bars 205, support wind turbine assembly 102. Further, central platform 404 acts to mount the system within an exterior housing 104 and to a building structure 400, such as to the roof of said structure 400.

In one exemplary embodiment, and as shown in the cross-sectional view of a portion of system 100 shown in FIG. 3, each funnel 204 may comprise a generally funnel shape (referred to as a "wind funnel"), whereby such a funnel 204 can comprise funnel side walls 210 that are relatively straight or flat, hyperbolic, or convex, in a design that scoops outward slightly to expedite airflow over the surface of the wind funnel (as discussed below). In at least one embodiment, wind funnel 204 has hyperbolic sides, as such a configuration may be optimal depending on the overall size and/or positioning of system 100. The wind funnel 204 directs air toward the vertical slit 206 and nozzle 207 (as discussed below). At least one embodiment of wind funnel 204 may comprise flat or straight sides, whereby wind funnel 204 would be similar in shape to a pyramid lying on its side with an open base to the outside and the apex toward the cylindrical blade drum 112.

As referenced above, at the apex of each funnel 204 is a vertical slit 206 corresponding to the vertical blades 114 in the cylindrical blade drum 112. Each funnel 204 is positioned external to the turbine assembly 102 whereby the apex of wind funnel 204 faces turbine assembly 102. Vertical slits 206, as shown in FIG. 2D, in at least one embodiment, are in the shape of a parallelogram with parallel vertical sides. In an exemplary embodiment, the height of the sides of each vertical slit 206 corresponds to the height of vertical blades 114, and the width of vertical slit 206 is no wider than one to two vertical blades 114 side by side. In such an embodiment, the ends of the vertical slits 206 (top and bottom) do not form a right angle corner but instead form a non-rectangular parallelogram to allow for the free dispersal of vortex air currents. Vertical slits 206 in wind funnels 204 correspond and align to focus all wind energy that passes through vertical slits 206 on to no more than two vertical blades 114 at a time. In addition to the foregoing, and in at least one embodiment of a system 100 of the present disclosure, at least one wind funnel 204 of an exemplary system is provided with a vertical slit 206 that corresponds to, and is fitted with, a venturi nozzle 207 as shown in FIGS. 1A, 1C, 2A, and 3.

In at least one embodiment, and as shown in FIG. 3, each vertical slit 206 of each funnel 204 is identical in shape and size and focuses a larger wind area to a smaller area with higher pressure entering vertical slits 206 leading to nozzles 207 and vertical blades 114. Nozzles 207, in at least one embodiment, focus and funnel the wind coming through vertical slits 206 in wind funnels 204. Furthermore, and in at least one exemplary embodiment, nozzles 207 may comprise venturi nozzles 207.

Nozzles 207, in various embodiments, can be molded or stamped into the wind funnels 204 without the need for a separate nozzle 207 part. Additionally, in at least one embodiment, the relative widths of vertical slits 206 could be adjusted/sized depending on the particular system 100 configuration. Should a wider vertical slit 206 configuration be necessary, multiple nozzles 207 may be used per wind funnel 204. In situations where vortexes or eddies associated with back pressure in wind funnels 204 due to the aperture/vertical slit 206 being too narrow, wider apertures 206 may be used.

Figure 5A:
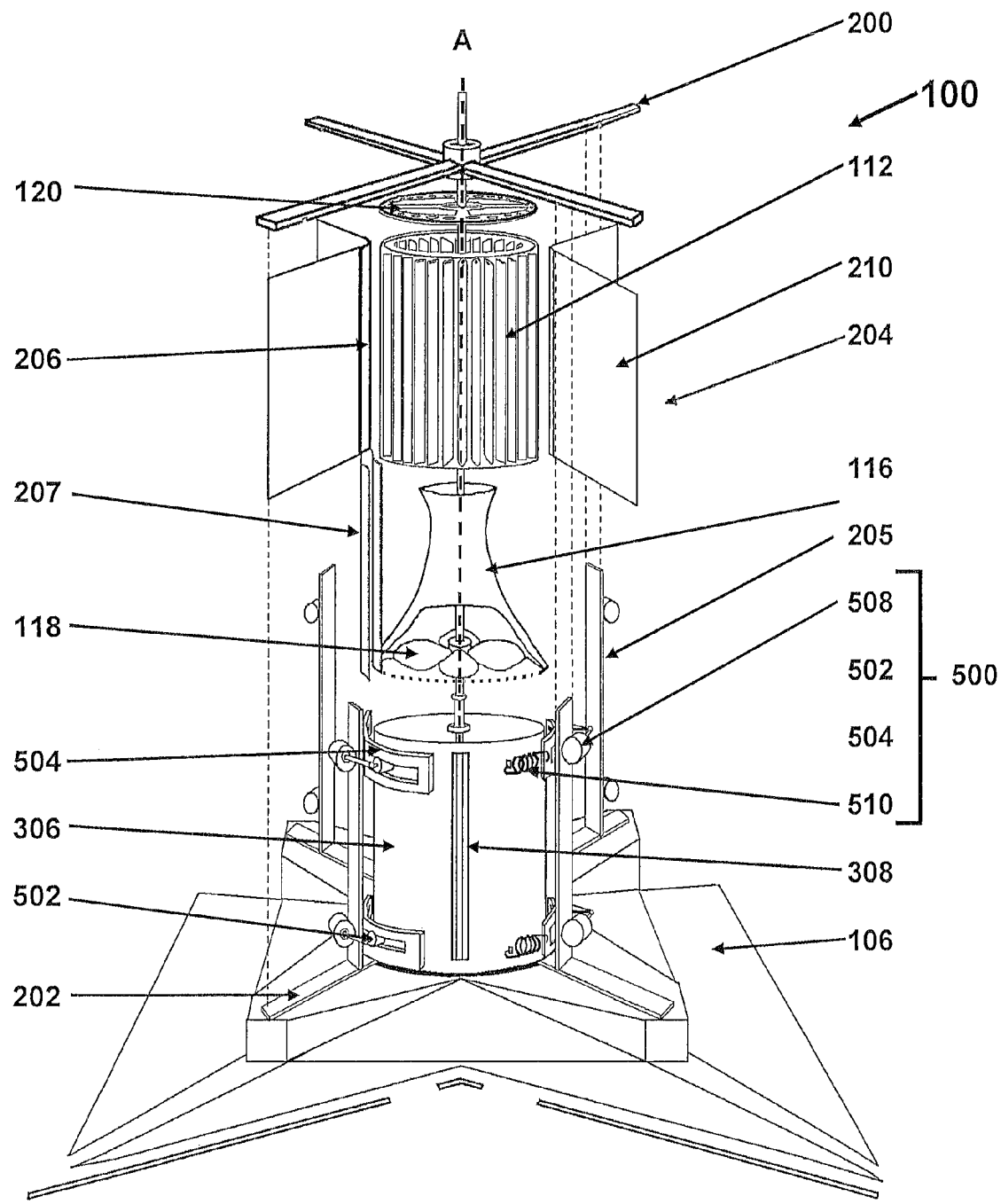
FIGS. 5A and 5B show exploded views of various components of embodiments of wind brake assemblies as partial exemplary systems to generate electricity using a flow of air according to the present disclosure.
Figure 6:
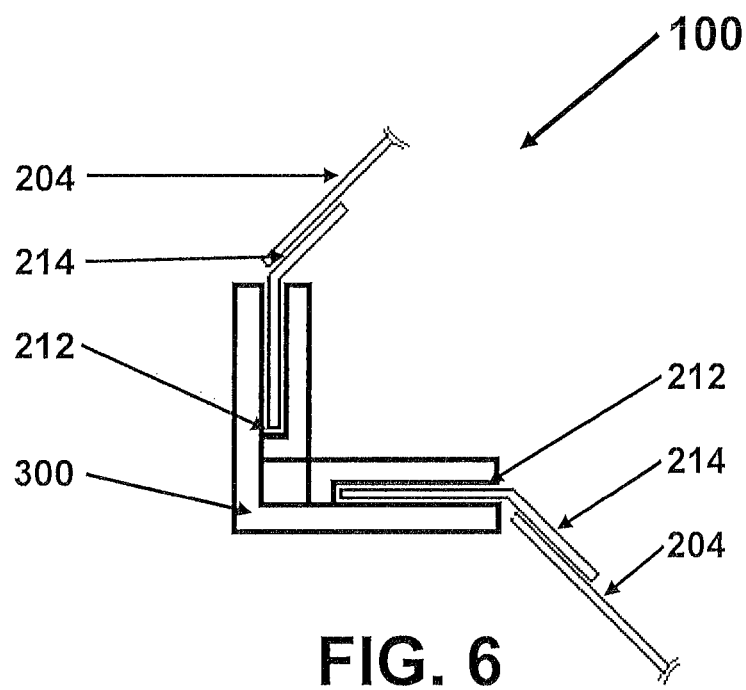
FIG. 6 shows a partial cross-sectional view of a portion of an embodiment of a corner vertical housing support assembly and wind funnel flanges according to the present disclosure.

As referenced above, and in an exemplary embodiment of an exterior housing assembly 104 of the present disclosure, exterior housing assembly 104 comprises a top cross-member 201 and a bottom cross-member 202 and a plurality of wind funnel assemblies 204 as shown in FIGS. 1A and 2A. Assembly 104 may further comprise a support and mounting system for turbine assembly 102, a plurality of vertical tie bars 205 and corner vertical housing supports 300 as shown in FIGS. 2A and 3. The bottom cross-member 202, positioned below fan blade 118 of the turbine assembly 102, is used as a platform for the turbine assembly 102 and as a mounting support to central platform 404 as shown in FIG. 2A. In at least one exemplary embodiment the bottom cross-member 202 also ties and aligns turbine assembly 102 to a plurality of vertical supports 300 external to wind funnels 204 as shown in FIGS. 2A and 3. Vertical supports 300, in at least one embodiment, are coupled to the top cross-member 201 and the bottom cross-member 202 to provide attachment of or to exterior housing assembly 104 with joining flanges 214 as shown in FIG. 6. In at least one exemplary embodiment, vertical tie bars 205 maintain spacing, and tie the assembly together with top cross-member 201 and bottom cross-member 202 as shown in FIG. 5A. When constructing portions of system 100, and after wind funnels 204 are positioned about vertical tie bars 205, the top cross-member 201 may be installed to lock all or substantially all of the components in place. In one embodiment, the top cross-member 201 and bottom cross-member 202 may also tie the turbine assembly 102 into the outer corners 300 of the exterior housing assembly 104 (also referred to herein as a "cupola").

In at least one embodiment, four vertical tie bars 205, a top cross-member 201, and a bottom cross-member 202 may operate together to prevent turbine assembly 102 from being compressed and thus preventing proper operation of system 100. In an exemplary embodiment of system 100, vertical tie bars 205 may fit within grooves 203 defined within top cross-member 201 and bottom cross-member 202.

In at least one embodiment of a system to generate electricity using a flow of air of the present disclosure, system 100 is mounted to a roof using bottom cross-member 202 as a base, top cross-member 201 tied together with vertical tie bars 205 to form a rigid box around turbine assembly 102. Bottom cross-member 202, in at least one embodiment, is mounted onto rigid base 404 using threaded rod assembly 900 through base mounting holes 401 to the roof decking using foot plate mounting assembly 800 as shown in FIGS. 2A, 2B, 2C, 8A, 8B, 9A, and 9B.

Figure 14:
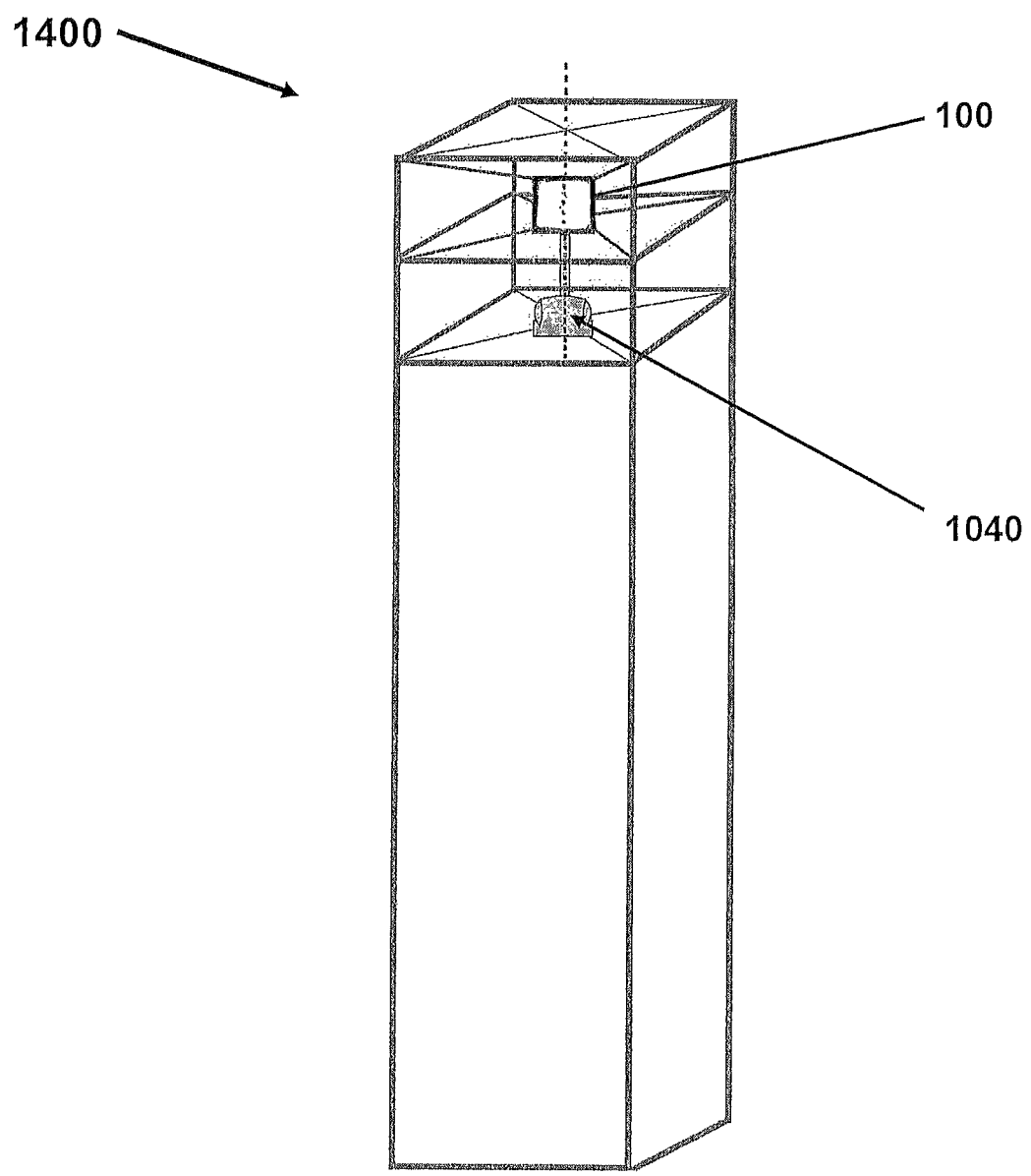
FIG. 14 shows a perspective view of an embodiment of an exemplary application of the wind power system applied to a high rise or skyscraper.
Figure 15:
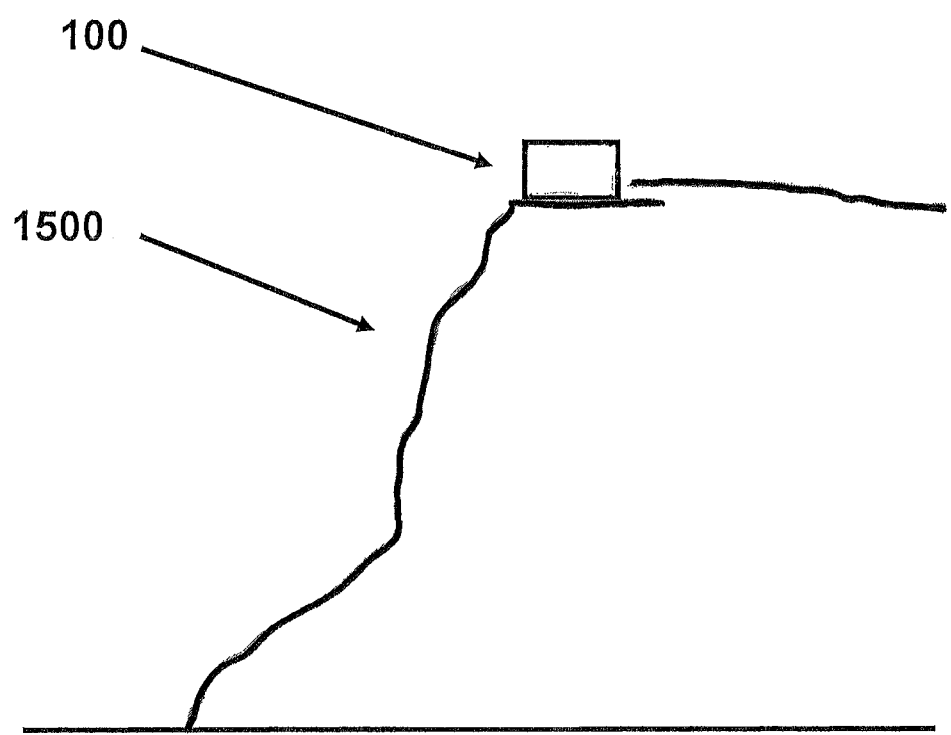
FIG. 15 shows a perspective view of an embodiment of an exemplary application of the wind power system applied to an exampled of a scaled application to a hill side or mountain top.

In at least one embodiment of a system to generate electricity using a flow of air of the present disclosure, such a system 100 is mounted within an exterior housing assembly 104. The exterior housing assembly 104 provides protection from the weather for system 100 and isolates the blades from the outside for safety to birds, animals and people, for example. The exterior housing can take numerous configurations, for example that of a cupola when used on top of a roof. System 100 and/or components of system 100 (such as electric generator system 1040, comprising at least alternator/generator 110 and optionally clutch 132) can also occupy one or more floors of a high rise building 1400 as shown in FIG. 14 or could be set on a hillside or mountaintop 1500 where the enclosure could imitate its surroundings as shown in FIG. 15.

In an exemplary embodiment of exterior housing assembly 104, and as shown in FIG. 2A, exterior housing assembly 104 comprises a top cross-member 201, a bottom cross-member 202 and a plurality of wind funnels 204, with each funnel 204 having a flat or convex portion and defining a vertical slit 206 therein. In addition to the foregoing, top cross-member 201 and bottom cross-member 202, in at least one embodiment of a system 100 of the present disclosure, are further operable to house the top hub assembly 120 and the bottom hub assembly 122, respectively, as shown in FIGS. 1A, 1D, and 1E.

In at least one embodiment of a system 100 of the present disclosure, top cross-member 201 ties and aligns the turbine assembly 102 to the vertical shaft 108. The turbine assembly 102 is joined to the exterior housing assembly 104 by attaching vertical supports 300 to the top cross-member 201, bottom cross-member 202 and central platform 404 as shown in FIG. 2A. As shown in FIG. 2A, bottom cross-member 202 may be positioned above rigid base 401 to further assist with aligning bottom cross-member 202 within system 100. When in place, bottom cross-member 202 may further align exterior housing assembly 104 when this configuration is used. Furthermore, rigid base 404 may act as a base for installation of the components of turbine assembly 102.

In one exemplary embodiment, when used with exterior housing 104 the components of turbine assembly 102, namely bottom hub assembly 122, fan blade 118, cone 116, cylindrical blade drum 112, and top hub assembly 120, may each be slid over vertical shaft 108, in order. Wind funnels 204, in at least one embodiment, align and attach to vertical tie bars 205, thereby adding overall strength and further aligning the components of system 100.

Figure 1D:
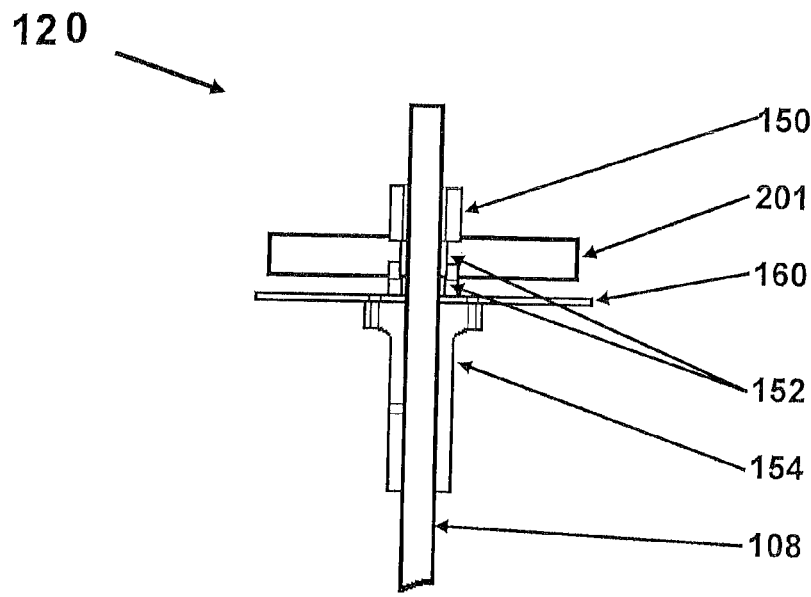
FIG. 1D shows a drawing of an exemplary configuration of an embodiment of a top hub assembly as part of a vertical blade assembly according to the present disclosure.
Figure 1E:
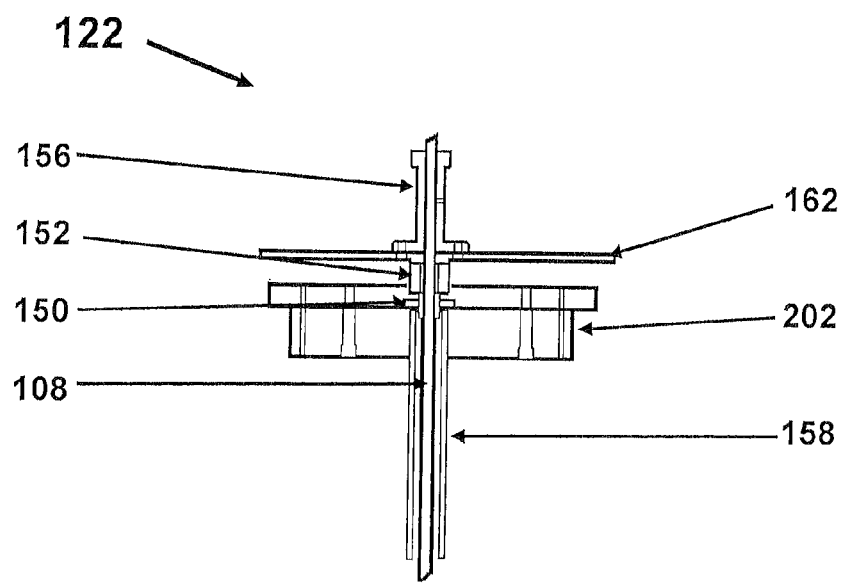
FIG. 1E shows a drawing of an exemplary configuration of an embodiment of a bottom hub assembly as part of a vertical blade assembly according to the present disclosure.

Bottom hub connector assembly 156, as shown in FIGS. 1A and 1D, may permit substantially or completely frictionless rotation of cylindrical blade drum 112 by way of various bushings, bearings, and/or earth magnet components coupled to one or more portions of system 100 via vertical shaft 108.

In at least one embodiment, bottom cross-member 202, with bottom hub connector assembly 156 as shown in FIGS. 1A and 1D, may comprise at least one earth magnet 208 to replace bearings 152, whereby earth magnets 208 permit the frictionless rotation of cylindrical blade drum 112. In such an embodiment, a relatively minor air flow, either horizontally external to system 100 or vertically from within, for example, a hot attic, would allow cylindrical blade drum 112 to freely rotate. In various other examples, one or more bushings 150 and/or bearings 152, as shown in FIGS. 1A, 1D, and 1E, may be used to physically couple various portions of turbine assembly 102 together and still permit rotation of cylindrical blade drum 112. Cylindrical blade drum 112, in at least one example, may use industrial-grade bearings 150 and bushings 152 at the top and bottom of cylindrical blade drum 112 to afford the least torque resistance and maximum durability when using such a physical coupling.

Components of an exemplary top hub assembly 120 of the present disclosure are shown in FIG. 1D. As shown in FIG. 1D, an exemplary top hub assembly 120 comprises a top cross-member 201, a top hub plate 160, and a top hub connector 154, whereby each of said components is coupled together to form said top hub assembly 120 by way of vertical shaft 108. In addition, and as shown in FIG. 1D, top hub assembly may optionally comprise one or more bushings 150 and/or bearings 152 positioned at various locations about top hub assembly 120 to facilitate easy movement of said components.

Similarly, an exemplary bottom hub assembly 122 of the present disclosure is shown in FIG. 1E. As shown in FIG. 1E, an exemplary bottom hub assembly 122 comprises a bottom hub connector 156, bottom hub plate 162, and a bottom cross-member 202 held in place using a vertical shaft 108. Various bushings 150 and/or bearings 152 may also be used as described herein. Furthermore, an optional tube 158 may be used around vertical shaft 108, providing structure to couple one or more components of bottom hub assembly 122 thereto.

Top hub plate 160 and bottom hub plate 162, as described above and as shown in FIGS. 1A and 2A, may define a series of plate apertures 164 therethrough, so that top hub plate 160 and bottom hub plate 162 can provide structural support to system 100 while not preventing air flow through said system 100.

Figure 4A:
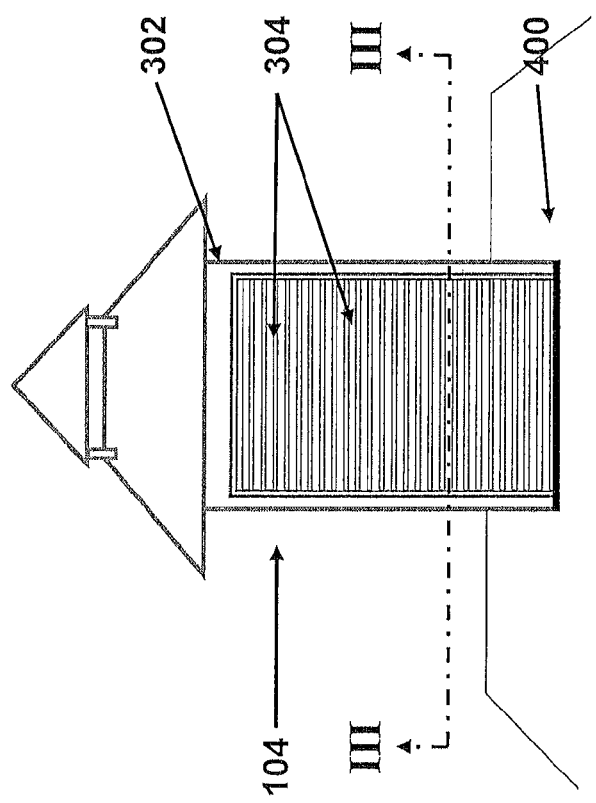
FIG. 4A shows a side view of at least a portion of an exemplary embodiment of an exterior housing assembly coupled to a building roof according to the present disclosure.

An exemplary exterior housing assembly 104 of the present disclosure as shown in FIG. 4A, along plane may optionally further comprise a plurality of housing walls 302 external to the plurality of wind funnels 204. Housing walls 302, as shown in the side view of an exemplary system 100 positioned upon a building structure 400 shown in FIG. 4A, may comprise a housing grill 304 dimensioned to permit the flow of external air into system 100. In at least one embodiment, apertures of housing grill 304 are defined using steel wire with such a configuration providing minimal restriction to outside air flow into system 100, but sufficient restriction to prevent birds, for example, from gaining access thereby avoiding injury. Wire grill 304 may have apertures having any number of shapes including, but not limited to, round, semicircular, oval, square, rectangular, triangular, and/or an irregular shape.

As shown in FIG. 4B, and provided as at least one exemplary embodiment of external wind flow through system 100 of the present disclosure, external wind (shown as arrows "W") may flow into system 100 through wind grill 304 of exterior housing assembly 104 and through at least part of cylindrical blade drum 112, whereby the wind would be deflected by cone 116 to cause the wind to then flow upward and back out of system 100. As shown in FIG. 4B, and provided as at least one exemplary representation of external wind flow through system 100 of the present disclosure, external wind (shown as arrows "W") would be deflected by top pyramid cone 144 to cause the wind to exit the lower pyramid 136. Additionally, hot air (shown as arrows "HA") exiting the attic through the inside of cone 116 would be directed through top pyramid cone 144 to exit pyramid 140 and separate from external wind flow.

In at least one embodiment, and as shown in FIGS. 4C and 4D, exhaust air would exit through a wind vane and vent assembly instead of using one or more pyramids as described herein. For example, and as shown in FIGS. 4C and 4D, a wind vane/vent 145 could be positioned above lower pyramid 136, and external wind "W" and/or hot air "HA" would escape wind vane 145 through wind vane aperture 146. Such an embodiment would not only provide a pleasing aesthetic appearance, but also could be used to direct exhaust air away from oncoming wind and would create a vacuum that would expedite the exhaust of air. Wind vane 145, in at least one embodiment, could swivel/rotate a full 360° using swivel mechanism 147 coupled to wind vane 145, noting that the vacuum created by such an embodiment (if rotated to form a vacuum as described above) would be directly proportional to the wind velocity since the wind would simultaneously be blowing into the wind funnels 204 and past the exit of wind vane 145 thus creating proportional flow of air at input and exhaust. Such an embodiment could have the effect of reducing or eliminating the potential for air backing up in other embodiments.

Figure 8A:
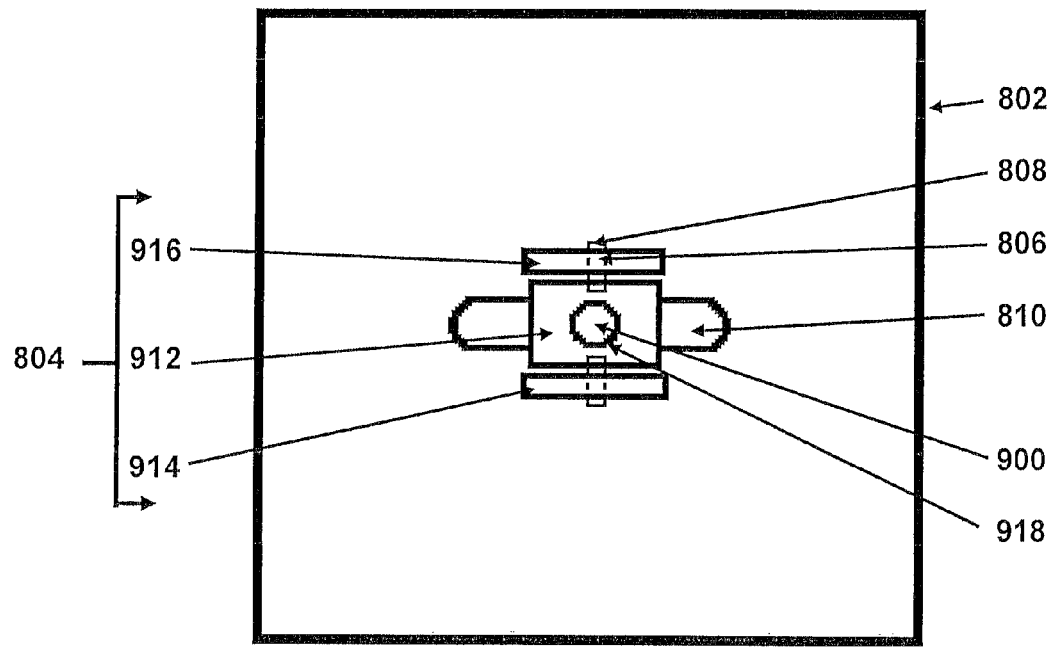
FIG. 8A shows top-down view of a portion of an embodiment of an exemplary foot plate mounting assembly according to the present disclosure.
Figure 8B:
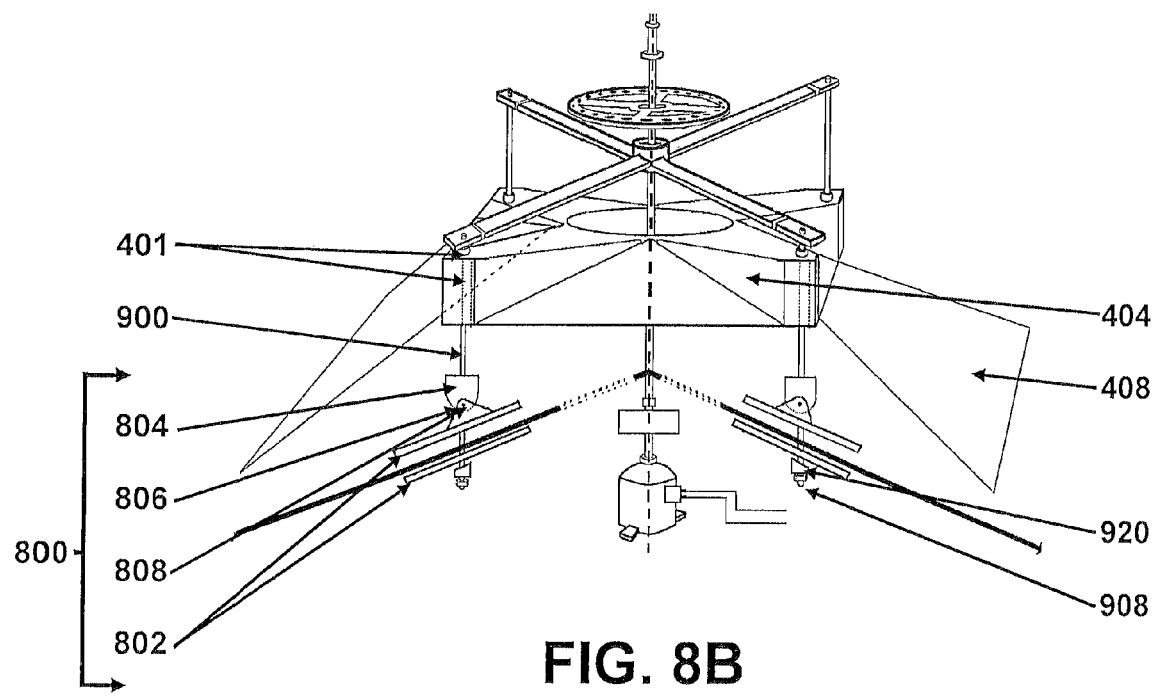
FIG. 8B shows a side view of an embodiment of a roof with a portion of the central platform and foot plate mounting assembly coupled thereto according to the present disclosure.

An exemplary exterior housing assembly 104 of the present disclosure could be affixed to a building structure 400, for example, by way of a foot plate mounting assembly 800 using a threaded rod assembly 900 as shown in one or more of FIGS. 1A, 2A, and 8B. Foot plate mounting assembly 800, as shown in FIGS. 1A, 2A, 8B in conjunction with rigid base 404 as shown in FIGS. 3, 8 is configured to position the exterior housing assembly 104 upon a building structure 400 based, in part, on the angle of the lower walls 408 as shown in FIG. 8B of the integrated scoop assembly 106. As shown in FIGS. 2A and 8B, and in at least one embodiment lower walls 408 of integrated scoop assembly 106 are configured at an angle to correspond to the angle of building structure 400, allowing integrated scoop assembly 106 to rest securely upon building structure 400. As shown in FIG. 2A, lower walls 408 of integrated scoop assembly 106 are configured at an angle to correspond to the angle of building structure 400, allowing integrated scoop assembly 106 to rest securely upon building structure 400 whereby most, if not all, of lower walls 408 of scoop assembly 106 contact building structure 400. A central platform 404, as shown in FIGS. 1A, 2A, and 8B may be substantially horizontal to correspond to the alignment of the bottom cross-member 202. Furthermore, an optional ridge collar 409, as shown in FIG. 2A, may be positioned between central platform 404 and building structure 400, whereby ridge collar 409 is configured to engage a building structure apex 410 (such as a roof peak) and provide support for central platform 404.

In at least one embodiment, central platform 404 and integrated scoop assembly 106 operate to funnel hot air rising from an attic trough slits cut in the roof decking (namely roof apertures 130 shown in FIGS. 1A and 2A) up and through central platform aperture 406 and through fan blade 118 and cone 116. Central platform 404 and integrated scoop assembly 106 may also act as an integral base for exterior housing assembly 104 and base for wind funnels 204. Such a design allows hot air to exit the attic through roof apertures 130 and a central platform aperture 406, channeled by central platform 404 and integrated scoop assembly 106 (as shown in FIGS. 1A and 2A), which directs the air through the fan blades 118 and through the center of cone 116 thereby gaining additional energy from the hot air in the attic. Central platform 404, in at least one embodiment, also increases the available area of wind by integrating into funnel 204 thereby expanding the volume of air being directed to vertical blades 114 of cylindrical blade drum 112.

When used for residential or small industrial designs, for example, various portions of a system 100 of the present disclosure may be enclosed within an exterior housing assembly 104, as shown in FIGS. 2A, 4A, and 4B, which integrates internal portions of system 100 into the overall design and architecture of the building. As discussed herein, such a system 100 may also operate as a hot air ventilation system for structural attics. Due to potential damage from the weather, an exemplary exterior housing assembly 104 may further operate to protect the inner components of system 100 from, for example, rain and snow. Such protection may be provided by, for example, gravity when rain or snow enters housing grill 304 of exterior housing assembly 104 (to allow the rain or snow to drain from exterior housing assembly 104), and may also be provided by the physical barrier protection of wind funnels 204 and/or a wind break drum 306 as shown in FIG. 3 and discussed below. Furthermore, exterior housing assembly 104 may attach to wind turbine assembly 102 of system 100, and may be aligned to the building structure 400, through central platform 404 assembly, as discussed in herein.

As shown in FIG. 1A, a vertical shaft 108 is used within system 100 to couple various components together and align said components to allow system 100 to operate. As shown in FIG. 1A, vertical shaft 108 comprises a first end 126 and a second end 128, whereby second end 128 of vertical shaft 108 is positioned within an alternator/generator 110 coupled to an interior portion of a building. Operation of system 100, by rotation of cylindrical blade drum 112 due to air flow from outside and/or inside of a building, causes vertical shaft 108 to rotate, with rotation of vertical shaft 108 causing alternator/generator 110 coupled thereto to operate and generate electricity. For example, rotation of vertical shaft 108 may cause alternator/generator 110 coupled to an electrical system (shown in FIG. 10) to operate and provide direct current (DC) electrical power (or alternating current (AC) electrical power, depending on the type of alternator/generator 110 used) for designated applications. As shown in FIGS. 1A and 2A an exemplary system 100 may further comprise an optional clutch 132 operably coupled to vertical shaft 108, whereby clutch 132 is operable to engage rotation of vertical shaft 108.

In addition to the foregoing, any number of additional components including any number of forms of transmissions or coupling devices for use with turning vertical shaft 108 and/or assembling the various portions of an exemplary system 100 are also within the scope of the present application. For example, one or more bushings 150 or bearings 150, as shown in FIGS. 1A, 1D, and 1E may be used between one or more components of an assembled system 100. As shown in FIG. 1A, and in at least one embodiment of a system 100 of the present disclosure, a bushing 150 may be positioned around vertical shaft 108 between fan blade 118 and bottom hub assembly 122.

In at least one exemplary embodiment of a system 100 of the present disclosure, system 100 further comprises at least one wind break drum 306 as shown in FIGS. 3 and 5. Wind break drum 306, in at least one embodiment, is a circular drum with four break apertures 308 corresponding to vertical slits 206 in wind funnel 204. Wind break drum 306 occupies the next concentric ring outbound from the center axis A-A after cylindrical blade drum 112, and in at least one embodiment, resides 0.25" from the outside diameter of cylindrical blade drum 112 and 0.25" inside the fixed nozzles 207 as shown in FIG. 3. Wind break drum 306, when used within an exemplary system 100 of the present disclosure, operates to protect vertical blades 114 from excessive wind speed.

In an exemplary embodiment, cylindrical blade drum 112 is surrounded by wind break drum 306 having four break apertures 308 corresponding to four nozzles 207 that funnel and direct the wind to vertical blades 114 of cylindrical blade drum 112. Wind break drum 306, in such an exemplary embodiment, operates by rotating away from a maximum opening to a minimum opening, for example, and in low wind conditions, the combination of vertical slits 206 and break apertures 308 are open 100% to allow all available wind to engage vertical blades 114. As the rotational speed of vertical shaft 108 increases due to wind speed increases beyond the optimum operating range (for example, 25 mph in at least one embodiment), a mechanism 500 (as shown in FIG. 5A) rotates wind break drum 306 and corresponding break apertures 308 so that outside wind is effectively prevented (substantially or completely) from entering vertical blades 114. In at least one embodiment, mechanism 500 may provide various degrees of closing wind break drum 306 to more precisely control the rotational speed of vertical shaft 108. A positioning device such as a solenoid or servo motor 508 engages to close the combination of vertical slits 206 and break apertures 308 in relation to each other. By rotating wind break drum 306 in such a manner, the amount of wind reaching vertical blades 114 is restricted. The amount the combination of vertical slits 206 and break apertures 308 are open is inversely proportional to the over-wind condition so that system 100 utilizes all available wind while simultaneously protecting the portions of system 100 from wind damage. Such an exemplary wind break drum 306 requires few moving parts and maintains maximum efficiency as it automatically adjusts to control the amount of wind reaching vertical blades 114 over the entire range of wind conditions.

Figure 1F:
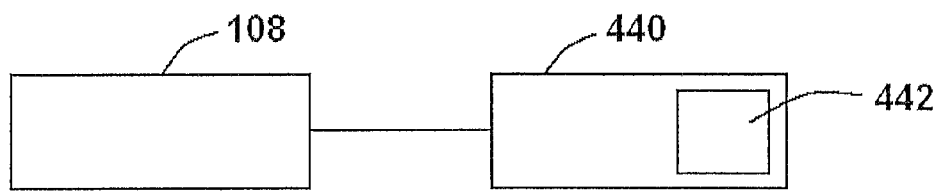
FIG. 1F shows a block diagram of various components of a exemplary system to generate electricity using a flow of air according to the present disclosure.

In various embodiments of systems 100 of the present disclosure, a control board 440 could be used monitor basic parameters of system 100 and allow the appropriate response(s). For example, vertical shaft 108 and/or control board 440 would host a transducer device 442, as shown in the component block diagram of FIG. 1F, that will generate pulses equivalent to rpms and can be converted to amps and volts equivalents. Control board 440 (and/or componentry connected thereto) could then operate to monitor shaft 108 speed, voltage, current and position of several components. Additionally, several "fail safe" features could be included and monitored by control board 440 as described herein. For example, wind break drum 306 could "lock" in the closed position. Several parameters could cause wind break drum 306 to close, including, but not limited to, (a) over-wind for an extended period of time to initiate a safety shut down, and (b) icing or other encumbrances that could would system 100 to lock up could initiate a "lock" of wind break drum 306. Such parameters, in various embodiments, could be initiated/integrated with the electronic clutch assembly (clutch 132). For example, an in at least one embodiment, when at less that 3 mph, clutch 132 could disengage allowing components of system 100 to free wheel. If said components do not free wheel and immediately goes to 0 rpm, components of system 100 (such as control board 440) could initiate a "time out" or shut down. Wind sensors/low end strain gauges, for example, could reside in the wind funnel assembly 200 to monitor wind speed. If wind speed is zero and there is no rotation, system 100 could "see" a lock-up of said components and go into shut-down and initiate an alarm/indicator.

In at least one embodiment, and as shown in the exploded view of various components of a partial exemplary system 100 of the present disclosure shown in FIG. 5A, wind break drum 306 is mounted to vertical tie bars 205, using eight pins 502, namely four pins 502 at the top and four pins 502 at the bottom positioned equidistant to each other, respectively. Each pin 502, in such an embodiment, is mounted directly to wind break drum 306 and projects horizontally 90 degrees to the side as shown in FIG. 5A. Pins 502 slide within corresponding horizontal slides 504 that are mounted onto vertical tie bars 205 with four horizontal slides 504 at the top and four horizontal slides 504 at the bottom. Horizontal slides 504, in such an exemplary embodiment, are the tracks that pins 502 rest in and move in. In combination with a wind break positioning device, such as a solenoid or servo motor 508 mounted at the top of vertical brace 506, wind break drum 306 is pushed to either partially or completely block wind from entering nozzles 207 through wind break aperture 308. Wind break drum 306, in at least one embodiment, has at least one spring 510 that returns the wind break drum 306 to a "null" position or the fully open position.

As the wind speed increases during operation of an exemplary system 100 of the present disclosure, the (rpm), revolutions per minute increases. An alternator/generator 110 coupled to a vertical shaft, as shown in FIGS. 1A and 2A, generates a current directly proportional to the rpm of vertical shaft 108. As the current rises beyond a present threshold of an over-wind condition, positioning device such as a solenoid or servo motor 508 operates to push wind break drum 306 so wind break aperture 308 is in a proportionally closed position. As the wind subsides, and in an exemplary embodiment, spring 510 returns wind break drum 306 and associated wind break aperture 308 to a full open position. In at least one embodiment, one spring 510 is mounted on each pin 502 for responsiveness and balance.

Figure 5B:
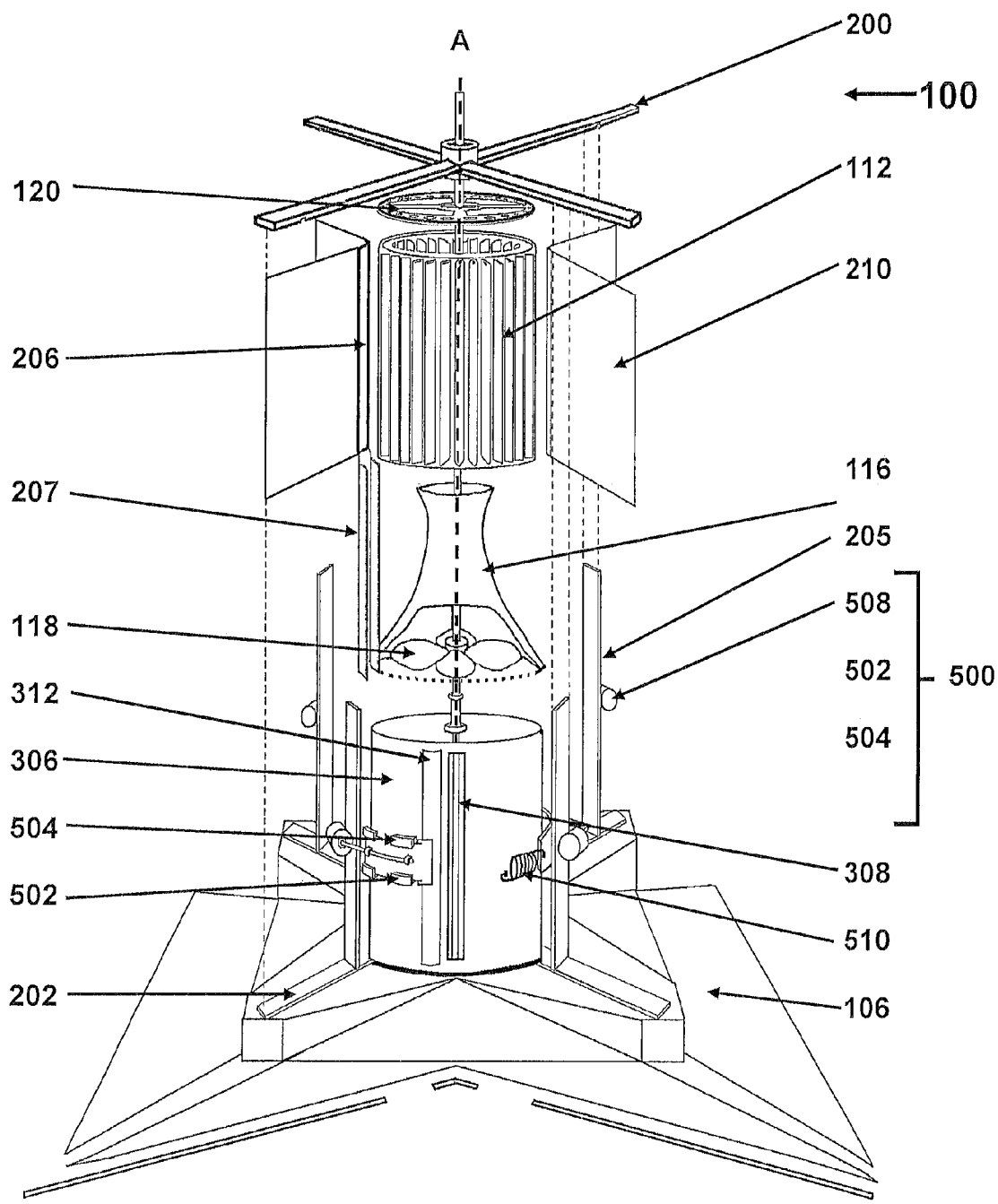

In another exemplary embodiment of a system 100 of the present disclosure, system 100 further comprises at least one wind break drum 306 as shown in FIGS. 3, 5A, and 5B. Wind break drum 306, in an exemplary embodiment, is a circular drum with four break apertures 308 corresponding to vertical slits 206 in wind funnel 204. Wind break drum 306 occupies the next concentric ring outbound from the center axis A-A after cylindrical blade drum 112. In such an exemplary embodiment, wind break drum 306 remains stationary and does not rotate. Instead, wind break shutters 312 coupled to electronic positioning device, such as a solenoid or servo motor 508 (using four wind break shutters 312 coupled to electronic positioning device such as a solenoid or servo motor 508, for example) move to close wind bread apertures 308 as shown in FIG. 5B. As the current (air flow) rises beyond a present threshold of an over-wind condition, electronic positioning device such as a solenoid or servo motor 508 operates to push wind break shutter 312 so wind break aperture 308 is in a proportionally closed position. As the wind subsides, and in an exemplary embodiment, spring 510 returns wind break shutter 312 and associated wind break aperture 308 to a full open position. In at least one embodiment, one spring 510 is mounted on each pin 502 for responsiveness and balance.

An exemplary exterior housing assembly 104 of the present disclosure may comprise the following components and may be secured to central platform 404 as follows. For example, and as shown in FIG. 2A, corners of the cupola (namely vertical supports 300 of exterior housing assembly 104) may be fabricated using metal "angle stock." Such corners would then be formed into a box-like configuration by welding, for example, 6" strips of sheet metal (horizontal supports 310 as shown in FIG. 2, of substantial thickness to have the required mechanical properties) on all four sides at the top, thereby joining and forming four equal sides. Such angle stock, as shown in the partial cross-sectional view of a portion of system 100 shown in FIG. 6, may also comprise fabricated grooves 212 running the length of the angle stock (vertical supports 300) from top to bottom that may accommodate wind funnels 204. In at least one embodiment, wind funnels 204 have flanges 214 on their edges, as shown in FIGS. 2A and 6, running their length from top to bottom and may be mounted by sliding flanges 214 into the grooves 212 of the corner pieces (vertical supports 300) as shown in FIG. 6.

Figure 7:
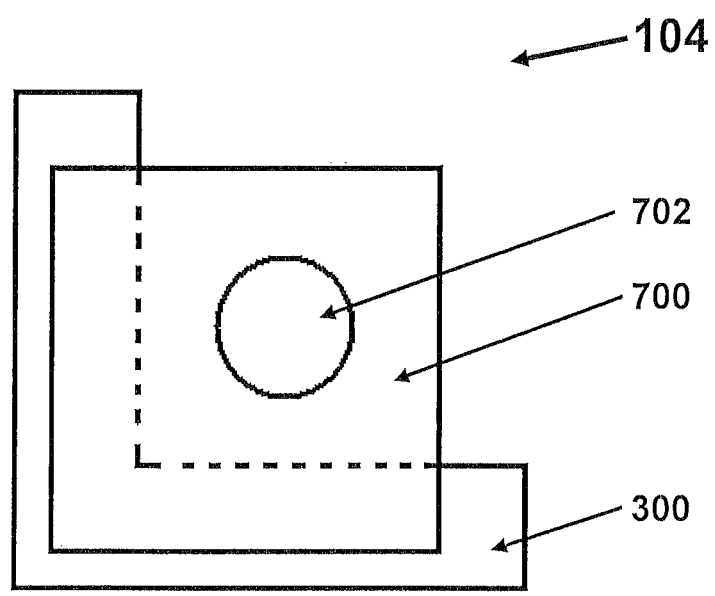
FIG. 7 shows a top-down or bottom-up view of a portion of an embodiment of an exemplary exterior housing assembly according to the present disclosure.

In at least one embodiment of the present disclosure the use of wind funnel 204 using flanges 214, as shown in FIG. 6, or vertical tabs 700, as shown in FIG. 7, are used to connect and stabilize the wind funnels 204 to a custom exterior housing, or cupola, optionally supplied as an factory fabricated accessory or by a builder to accommodate the wind turbine system 100. Furthermore, and in at least one embodiment of a portion of an exterior housing assembly 104 of the present disclosure shown in the top-down view (or mirror-image bottom-up view) shown in FIG. 7, horizontal tabs 700 may be welded onto vertical supports 300, four at the top and four at the bottom. Such horizontal tabs 700 would comprise the mounting surface with a threaded hole 702 defined therein to accept a screw (not shown) running through the cross braces, namely, top cross-member 201 and bottom-cross member 202.

In at least one embodiment, and as shown in the top-down view of a portion of an exterior housing assembly 104 of the present disclosure shown in FIG. 8A, foot plate mounting assembly 800 may be coupled to the bottom ends of vertical threaded rods 900 to facilitate coupling of foot plate mounting assembly 800 to the roof of a building. A hole at the center of central platform aperture 406, as shown in FIGS. 2B and 2C corresponding to the bottom circumference of cone 116 as shown in FIG. 2A, whereby cone 116 sits directly above central platform aperture 406, funnels the hot air from the attic. Bottom-cross member 202, in such an embodiment, joins the top of central platform 404 with integrated scoop assembly 106 as shown in FIGS. 2A, 2B and 2C to form the chamber that encloses and funnels hot air from the attic up through cone 116.

In situations with roofs having a variable pitch where system 100 would be located, mounting any form of exterior housing 104 to such a roof may be performed as follows. The exterior housing assembly 104 would mount to the corners of central platform assembly 404 as shown in FIG. 2A. System 100 would mount to the central platform assembly 404 by securing bottom cross-member 202 to central platform 404 using threaded rods 900. By sliding threaded rod 900 through base mounting holes 401 and joining foot plate assembly 800, the system 100 is mounted to the roof of a building structure 400 as shown in FIGS. 1A, 2A, and 8B.

As shown in the side view of a roof with a portion of system 100 coupled thereto shown in FIG. 8B, threaded rods 900 would mount the exterior housing assembly 104 to central platform 404. Threaded rods 900 would then pass through base mounting holes 401 to foot plate mounting assembly 800. Foot plates 802 act as a footpad and washer assembly for threaded rod 900 and distribute the overall weight of system 100 upon a building structure 400. In at least one embodiment, foot plate 802 comprises an 8" square metal plate joined to the bottom of threaded rod 900. In at least one embodiment, foot plate mounting assembly 800 also has a second corresponding foot plate 802 on the underside of the roof decking to complete mounting of the assembly 800 to the roof of a building structure 400.

In one exemplary embodiment as shown in the top view 2B, side view 2C and partially exploded view 8B of a portion of the central platform 404, threaded rod 900 passes through mounting hole 401 (an effective tubular sleeve) as shown in FIG. 8B. Foot plate 802 may comprise an attachment portion 804, as shown in FIG. 8A, defining a pin aperture 806 to accept a roof pin 808 therethrough, forming a pivot axis for foot plate 802 to rotate along a single axis and align with the angle of building structure 400 as shown in FIGS. 8A, 8B, 9A, and 9B. Pin aperture 806 may be defined within, for example, a tubular sleeve (not shown) which itself may be enclosed except, for example, a nut bolted to a plate enclosing the tubular sleeve. Threaded rod 900, in at least one additional embodiment, may be coupled to foot plate 802 as described below.

Figure 9A:
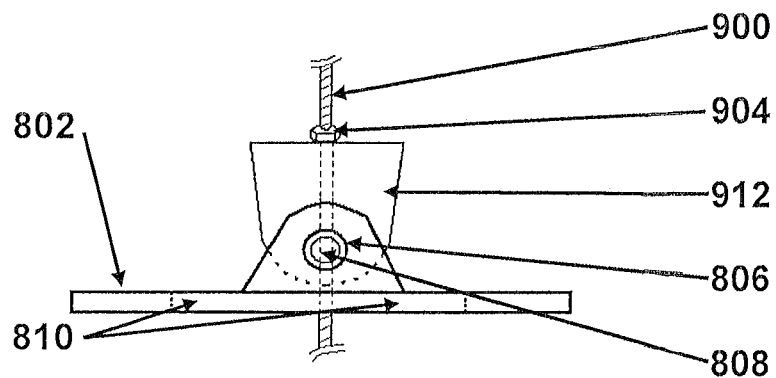
FIG. 9A shows a side view of an embodiment of a portion of an exemplary vertical support foot plate mounting assembly according to the present disclosure.
Figure 9B:
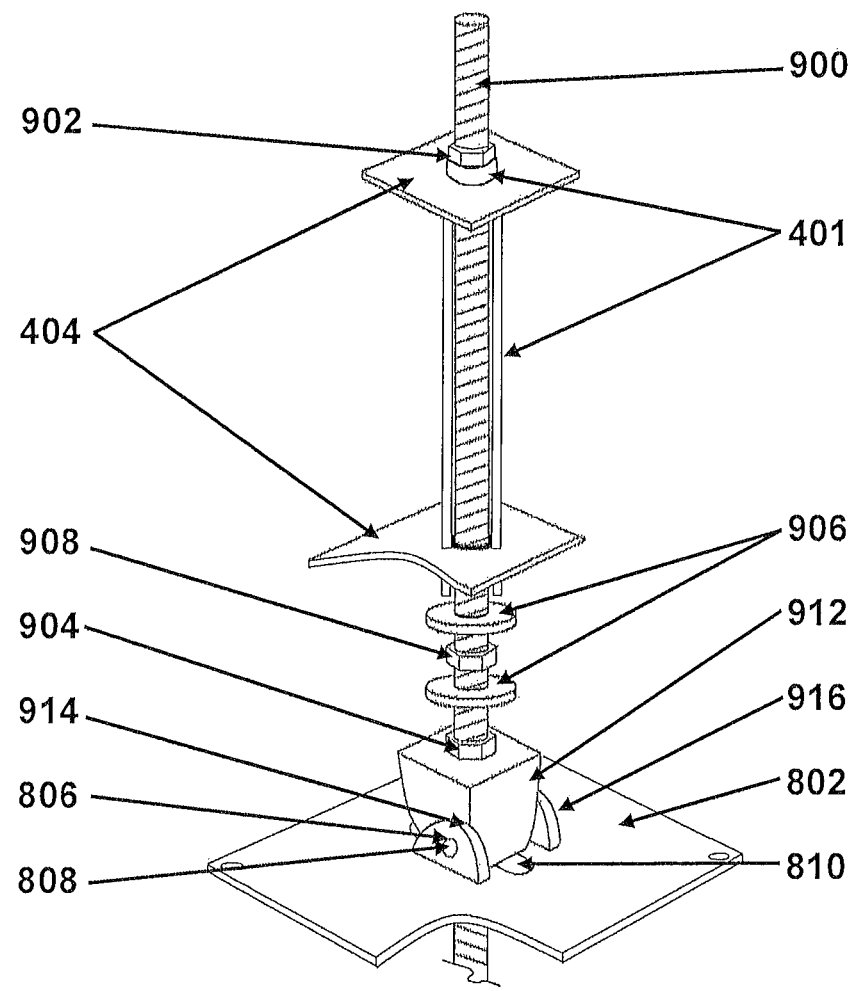
FIG. 9B shows a side view of an embodiment of an exemplary foot plate mounting assembly and threaded rod attachment assembly according to the present disclosure.

An additional view of a portion of a threaded rod 900 of an exemplary mounting assembly 800 of the present disclosure is shown in the exploded view of an exemplary foot plate mounting assembly 800 as shown in FIG. 9B. As shown in FIGS. 2C and 8B, a threaded rod 900 is shown running through tubular sleeve (hole 401). In at least one example, threaded rod 900 has a diameter of 0.5". Threaded rod 900, as shown in FIG. 9B, may be positioned through a tubular sleeve 401. Tubular sleeve, in such an embodiment, is the hole 401 embedded in the corners of central platform 404, whereby the tubular sleeve aperture is large enough to allow free passage of threaded rod 900 therethrough.

Threaded rod 900, top to bottom, may be threaded or passed through fixed reverse nut 902 which is welded at the top of the tubular sleeve (hole 401) onto central platform 404. A second adjustable nut 908 may affixed to threaded rod 900 below the bottom of the tubular sleeve (hole 401). In addition, a foot plate wedge washer 920, as shown in FIG. 8B, may be used along with adjustable nut 908 to provide support to an angled roof, as foot plate wedge washer 920 has an angled profile, as shown in FIG. 8B. A third nut 904 may be affixed to the top of foot 912. Additionally, threaded rod 900 passes through washers 906, through foot 912, through foot plate aperture 810 and into holes through roof of a building structure 400 to mount the foot plate mounting assembly 800.

Washers 906 and a bottom adjustable nut 908 may be positioned around and affixed to threaded rod 900 below the bottom of the tubular sleeve (hole 401) to make height and alignment adjustments. Movement of adjustable nut 908 causes maximum movement of the central platform due to the actions of reverse nut 902 and standard threaded nut 904. The purpose of the regular and reverse threads is to maximize movement of the threaded rod 900 with minimum turns of adjustable nut 908. Foot 912, as shown in FIG. 9B, couples to foot plate 802 by way of a roof pin 808 positioned through a first foot wall 914 and into foot 912 on one side, and through second foot wall 916 and into foot 912 on the other side. Threaded rod 900 may then have free movement side to side by pivoting within elongated plate aperture 810 defined within foot plate 802 and through a hole drilled into the roof decking. Further adjustment of adjustable nut 908 adjusts the length of threaded rod 900 below the bottom of tubular sleeve 401, with the net result being that the entire assembly including exterior housing assembly 104 can be leveled by using the adjustments on all four foot plate mounting assemblies 800.

Exterior housing assembly 104, as shown in FIG. 2A, may further comprise a housing roof assembly 134. In at least one embodiment, housing roof assembly 134 comprised of a lower pyramid 136 defining a pyramid aperture 138 therethrough, and further comprised of an upper pyramid 140 coupled to the lower pyramid 136 by way of four pyramid legs 142.

Housing roof assembly 134, when positioned at the top of exterior housing assembly 104, allows air within system 100 to escape, and as shown in FIG. 2A, prevents rain and/or show from entering the top of exterior housing assembly 104.

The exterior housing assembly 104 can then be mounted to a building structure 400 using the same threaded rods 900 to adjust the effective length of each vertical support 300. A similar metal plate to foot plate 802 may then be placed on the underside of building structure 400, effectively becoming a large washer to distribute the weight and force of system 100. Additionally, and by way of example, a second lock washer, one or more nylon spacer washers, and an additional nut completes the process of affixing the exterior housing assembly 104 to building structure 400.

In various embodiments, all electronic components could be positioned within the interior of central platform 404, which would eliminate the need for taking the vertical shaft 108 through the roof and into the attic of a building structure 400. Placement of clutch 132, alternator/generator 110, and/or other componentry of system 100 would allow system 100 to be mounted on any type of roof including a flat roofs without the need for a space under the building structure 400. In such an embodiment, the only components exiting system 100 would be a set of wires which could take any appropriate path necessary to match up to the controller and other electronic control systems.

Figure 10:
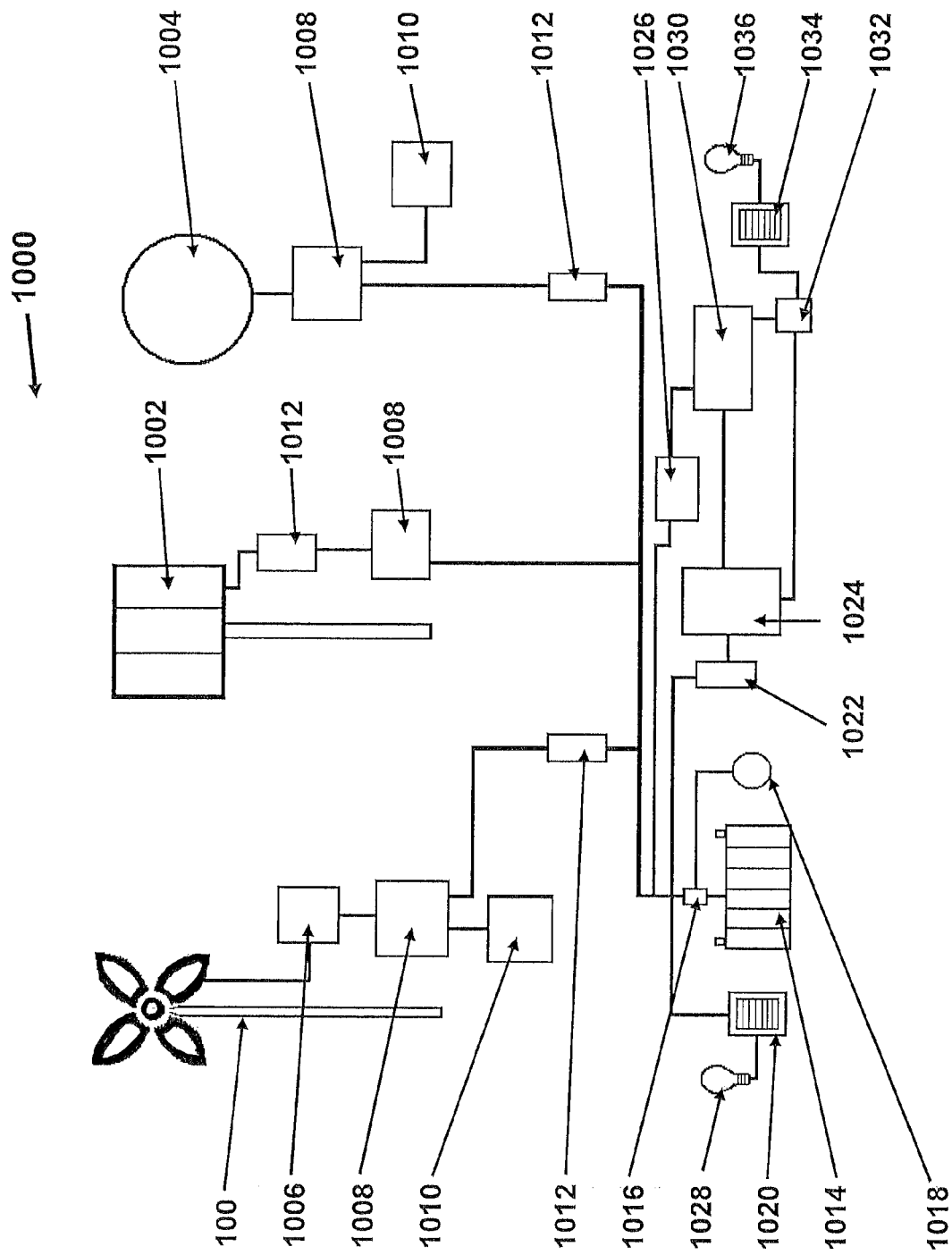
FIG. 10 shows an embodiment of an exemplary building power system diagram incorporating an exemplary system of the present disclosure.

As shown in the exemplary building power system diagram shown in FIG. 10, a system 100 of the present disclosure may comprise a portion of an overall power arrangement 1000. System 100, shown as a wind generator and tower in FIG. 10, is on of at least three exemplary power sources along with solar panel or array 1002 and auxiliary power source 1004, such as, for example, a water generator. Each of system 1000, solar panel or array 1002, and auxiliary power source 1004 may be electrically coupled to a lightning arrestor 1006, a charge controller 1008, a diversion load 1010, and/or a DC fuse or breaker 1012. One or more of the foregoing components may be electrically coupled to a battery bank 1014 (such as a lead-acid deep charge battery or other chargeable batteries suitable for such an application), shunt 1016, system meter 1018, DC fuse panel or breaker box 1020, DC fuse 1022, AC inverter 1024, and/or an auxiliary battery charger 1026, and may operate one or more DC loads 1028. One or more of the foregoing components, shown as electrically coupled to one another by way of DC wiring in FIG. 10, may further be coupled to an engine generator 1030, an AC transfer switch 1032, and/or an AC fuse panel or breaker box 1034, and may operate one or more AC loads 1036. These latter components are shown in FIG. 10 as being electrically coupled to one another using AC wiring. Power arrangement 1000 is merely one of many exemplary arrangements of power generation sources, such as system 100, with commercial and/or residential electrical demands.

Figure 11:
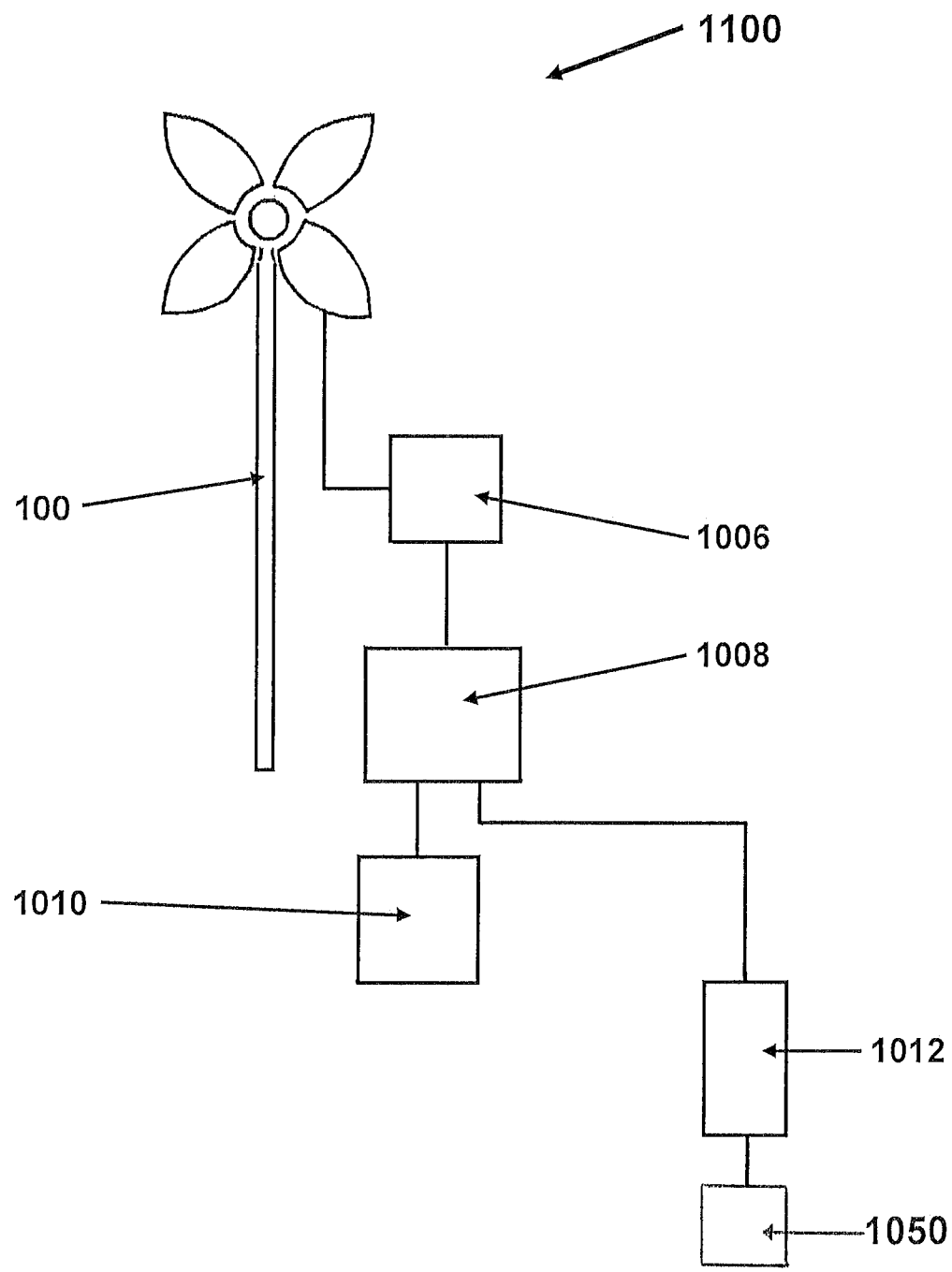
FIG. 11 shows a diagram of an embodiment of an exemplary wind power subsystem according to the present disclosure.

An exemplary wind power subsystem of the present disclosure is shown in the diagram shown in FIG. 11. As shown in FIG. 11, exemplary wind power subsystem 1100 comprises an exemplary system to generate electricity using a flow of air (system 100) electrically coupled to a lightning arrestor 1006, a charge controller 1008, a diversion load 1010, and a DC fuse or breaker 1012.

Additional exemplary wind power subsystems 1100 and/or systems 100 of the present disclosure may include additional other components as referenced herein or fewer components than those shown in FIG. 11. For example, and as shown in FIG. 11, system 100/subsystem 1100 may have one or more electrical storage systems 1050 coupled thereto, which may comprises a battery bank 1014 as shown in FIG. 10, and/or any other number of components capable of storing electricity, including electricity that may be generated using one or more systems 100 and/or subsystems of the present disclosure. Such electrical storage systems 1050, in various embodiments, are capable of storing and distributing electrical power from a number of sources, including wind and solar, and may include "super capacitors" that act as extremely efficient long-term storage systems with negligible losses.

In addition, the control systems that take a AC or DC charge (primarily DC charge) from the energy source (such as system 100) operate to regulate the electrical output from system 100. The control system, in various embodiments, comprises multiple inputs capable of taking inputs from several sources; wind and solar, for example. The control system also has electronics, loads, and optionally switching features that take the energy charge directly to a home/building or to a battery backup system. Other embodiments of control systems are operable monitor the charge coming into the energy system and will automatically switch to electricity from the grid if power levels drop below a certain level. Various components shown in FIG. 10, for example, could operate as control systems as generally referenced above.

Figure 12:
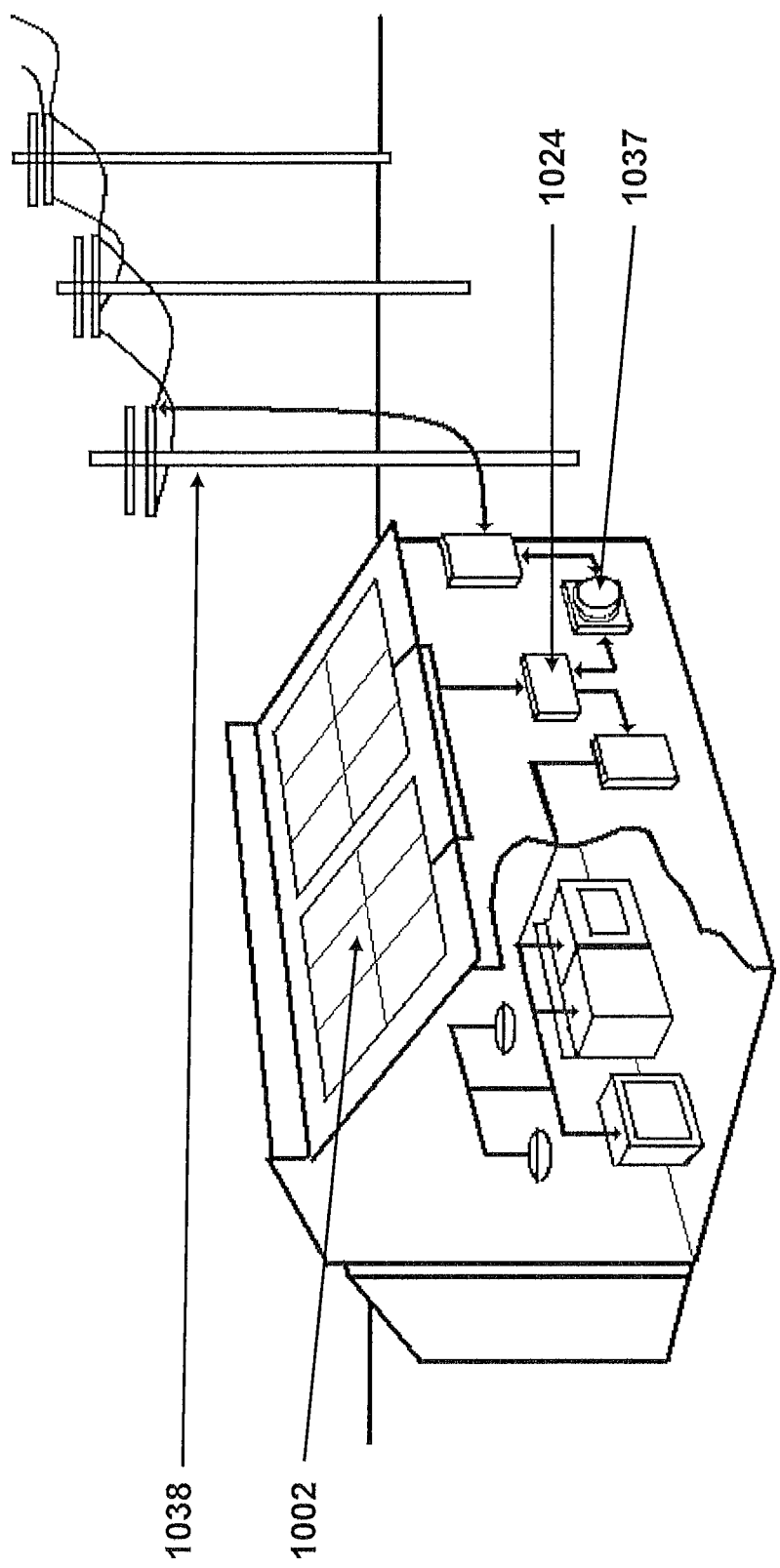
FIG. 12 shows a diagram of an embodiment of a building operably coupled to multiple sources of electricity according to the present disclosure.

A diagram of how an exemplary system 100 of the present disclosure useful with a building operably connected to a utility service is shown in FIG. 12. As shown in FIG. 12, a utility service may provide power to a building, and solar panels (solar panel or array 1002), for example, may provide another source of power. The solar panels shown in FIG. 12, as well as system 100 and/or a water generator 1004 as referenced in FIG. 10, may be used as sources of electricity along with the utility service 1038 shown in FIG. 12. As referenced in FIG. 10 and as shown in FIG. 12, various other components, such as an inverter (AC inverter 1024) and a meter 1037 may be used to facilitate use of various sources of electricity.

Figure 13:
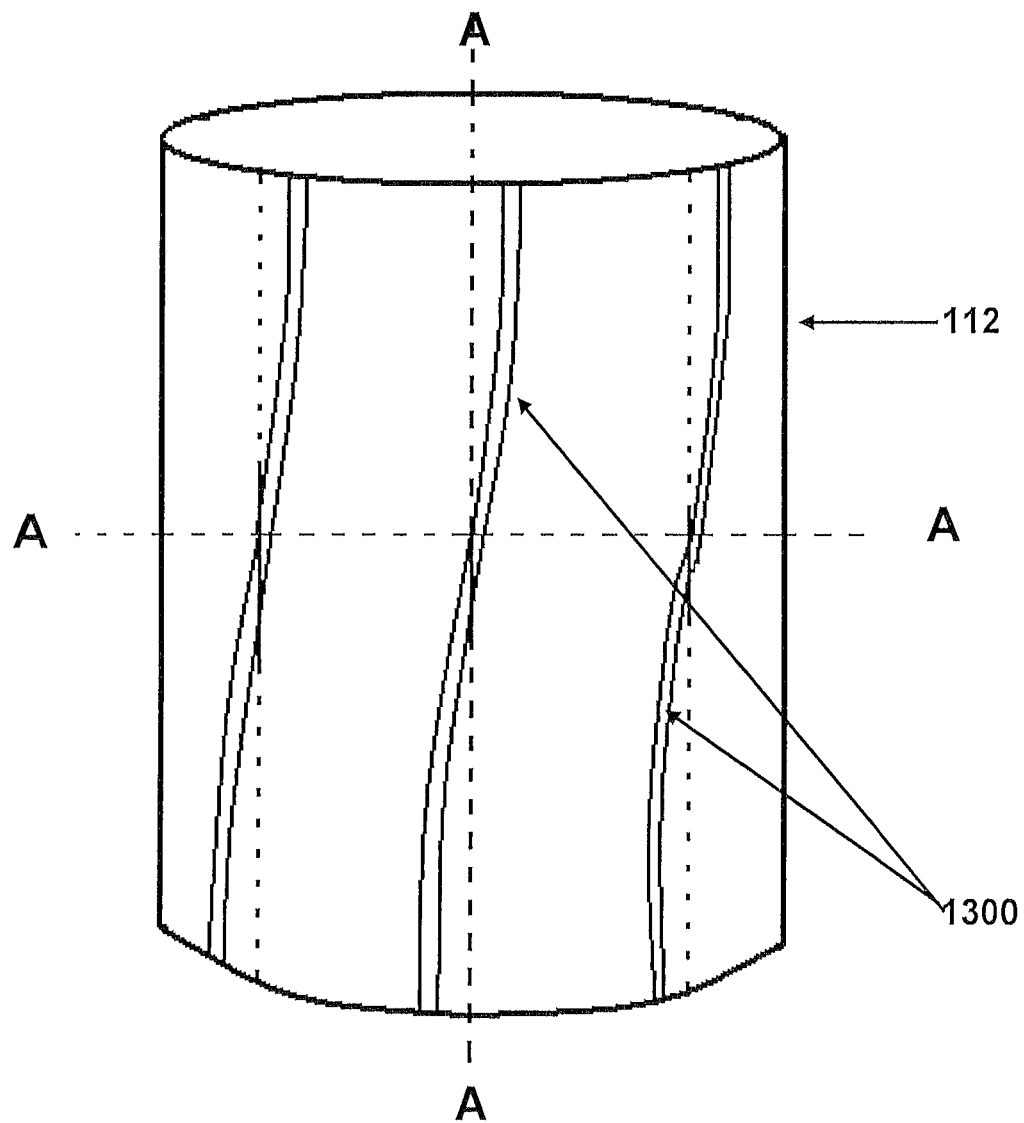
FIG. 13 shows a perspective view of an additional embodiment of an exemplary cylindrical blade and blade drum according to the present disclosure.

In at least one additional embodiment of a cylindrical blade drum 112 of the present disclosure, and should the airfoil design described above and shown in FIGS. 1A and 2A be insufficient to provide projected lift efficiencies, an alternate exemplary cylindrical blade drum 112 design comprises a configuration of one or more inversely scooped vertical blades 1300 with an inside edge that rotates in a relatively slight helical movement around a central axis as shown in the perspective view of an exemplary cylindrical blade drum 112 shown in FIG. 13. The total rotation of the axis running through the center of the cross section of such a vertical blade 1300 would be approximately 45 degrees from the top to the bottom, allowing for a gradual sloughing off of air as it exits through the vertical blades 1300 rotating slightly past the surface of the blade then up and out of the cylindrical blade drum 112.

In various embodiments of systems 100 of the present disclosure, components of said systems may be placed within system 100, within an attic of a building structure, in other areas within a building structure (room and/or basement), or external to a building structure as shown in FIG. 15.

While various embodiments of systems to generate electricity using a flow of air and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

I claim:

1. A system to generate electricity using a flow of air, the system comprising:
    a turbine assembly, comprising:
        a vertically-positioned cylindrical blade drum comprising a plurality of vertical blades, the cylindrical blade drum capable of rotation about a vertical axis,
        a cone positioned at least substantially within the cylindrical blade drum, the cone defining an upper cone aperture and a lower cone aperture having a larger diameter than the upper cone aperture, the cone configured to direct air up and out of the turbine assembly after the air has passed through the vertical blades,
        a fan blade positioned at or below the lower cone aperture and coupled to the cone, the fan blade capable of rotation with the cone to force air in an upward vertical direction through the lower cone aperture and the upper cone aperture, and
        a wind break drum cylinder substantially surrounding the cylindrical blade drum, the wind break drum cylinder defining a plurality of break apertures;
    an exterior housing assembly surrounding the turbine assembly, comprising
        a top cross-member,
        a bottom cross-member,
        a central platform sized and shaped to engage one or more components of the exterior housing assembly and to fit upon a building structure,
        a plurality of wind funnels, each wind funnel having a funnel wall defining a vertical slit at an apex of each wind funnel, each wind funnel positioned external to the turbine assembly whereby an apex of each funnel wall faces the turbine assembly, each wind funnel configured to focus air through an affixed nozzle onto the vertical blades, and
        a plurality of vertical supports external to the plurality of wind funnels, the plurality of vertical supports coupled to the top cross-member, the bottom-cross member, and the central platform; and
    a vertical shaft having a first end and a second end, the first end positioned at or near the turbine assembly and the second end positioned within an alternator/generator, wherein rotation of the cylindrical blade drum causes the alternator/generator to operate to generate electricity.

2. A system to generate electricity using a flow of air, the system comprising:
    a turbine assembly, comprising:
        a vertically-positioned cylindrical blade drum comprising a plurality of vertical blades, the cylindrical blade drum capable of rotation about a vertical axis, and
        a cone positioned at least substantially within the cylindrical blade drum, the cone defining an upper cone aperture and a lower cone aperture having a larger diameter than the upper cone aperture, the cone configured to direct air up and out of the turbine assembly after the air has passed through the vertical blades;
    an exterior housing assembly surrounding the turbine assembly;
    a plurality of wind funnels installed in the housing assembly, each wind funnel having a wind funnel wall defining a vertical slit at an apex of each wind funnel, each wind funnel positioned external to the turbine assembly, each wind funnel configured to focus the air through the vertical slit; and
    a vertical shaft having a first end and a second end, the first end positioned at or near the turbine assembly and the second end positioned within an alternator/generator, wherein rotation of a component of the turbine assembly causes the alternator/generator to operate to generate electricity.

3. The system of claim 2, wherein the exterior housing assembly comprises:
    a top cross-member;
    a bottom cross-member;
    a central platform sized and shaped to engage one or more components of the system and to fit upon a building structure; and
    a plurality of vertical supports external to the plurality of wind funnels, the plurality of vertical supports coupled to the top cross-member, the bottom-cross member, and the central platform.

4. The system of claim 2, wherein each funnel wall has a configuration selected from the group consisting of a flat configuration, a convex configuration, and a hyperbolic configuration.

5. The system of claim 2, further comprising:
    an integrated scoop assembly configured to position the exterior housing assembly upon a roof of a building structure.

6. The system of claim 5, wherein the integrated scoop assembly comprises lower walls configured to correspond to the roof to which the system is coupled thereto.

7. The system of claim 5, wherein the integrated scoop assembly comprises an upper wall configured to correspond to a central platform sized and shaped to engage one or more components of the exterior housing assembly.

8. The system of claim 2, wherein the turbine assembly further comprises a wind break drum cylinder substantially surrounding the cylindrical blade drum, the wind break drum cylinder defining a plurality of break apertures corresponding to the vertical slits of the plurality of wind funnels.

9. The system of claim 8, whereby wind passing through the vertical slits of the plurality of wind funnels and through the wind break drum cylinder is regulated by one or more wind break shutters operable to regulate wind flow available to the turbine assembly.

10. The system of claim 1, wherein each of the plurality of vertical blades comprises an airfoil configuration.

11. The system of claim 1, further comprising:
    a securing assembly for securing portions of the system to a building structure, the securing assembly comprising:
        a central platform sized and shaped to engage one or more components of the exterior housing assembly and to fit upon a building structure;

one or more threaded rods, each threaded rod having a first end and a second end, the first end of each threaded rod configured to engage the central platform; and one or more first foot plates sized and shaped to engage the second end of each threaded rod.

12. The system of claim 11, wherein the turbine assembly is positioned external to the building structure, and wherein the alternator/generator is positioned within the central platform.

13. A turbine assembly for use with a system to generate electricity using a flow of air, the turbine assembly comprising:

a cylindrical blade drum comprising a plurality of vertical blades;

a cone positioned concentrically within the cylindrical blade drum and affixed to the cylindrical blade drum, the cone defining an upper cone aperture and a lower cone aperture having a larger diameter than the upper cone aperture, the cone configured to direct air up and out of the turbine assembly after the air has passed through the vertical blades, the cone capable of rotation with the cylindrical blade drum; and a vertical shaft having a first end and a second end, the first end coupled to the cylindrical blade drum and the second end positioned within an alternator/generator, wherein rotation of the cylindrical blade drum causes the alternator/generator to operate to generate electricity;

wherein the turbine assembly is configured to fit within an exterior housing assembly comprising:

a top cross-member;

a bottom cross-member;

a central platform sized and shaped to engage one or more components of the exterior housing assembly and to fit upon a building structure, a plurality of wind funnels, each wind funnel having a wall defining a vertical slit at an apex of each wind funnel, each wind funnel positioned external to the turbine assembly whereby each funnel wall faces the turbine assembly, each wind funnel configured to focus the air therethrough onto the vertical blades, and a plurality of vertical supports external to the plurality of wind funnels, the plurality of vertical supports coupled to the top cross-member, the bottom-cross member, and the central platform.

14. The turbine assembly of claim 13, wherein each funnel wall has a configuration selected from the group consisting of a flat configuration, a convex configuration, and a hyperbolic configuration.

15. The turbine assembly of claim 13, further comprising:

a fan blade positioned at or below the lower cone aperture and coupled to an interior surface of the cone, the fan blade capable of rotation with the cone.

16. The turbine assembly of claim 13, wherein a wind break drum cylinder defines a plurality of vertical slit apertures corresponding to the vertical slits of the plurality of wind funnels.

17. The turbine assembly of claim 16, whereby rotation of the wind break drum regulates wind flow available to the turbine assembly.

\* \* \* \* \*